US008944905B2

(12) United States Patent
Odom et al.

(10) Patent No.: US 8,944,905 B2
(45) Date of Patent: Feb. 3, 2015

(54) METHOD OF LOTTERY WAGERING ON REAL-WORLD EVENTS

(71) Applicants: James M. Odom, Arroyo Seco, NM (US); Scott D. Yelich, Lancaster, PA (US)

(72) Inventors: James M. Odom, Arroyo Seco, NM (US); Scott D. Yelich, Lancaster, PA (US)

(*) Notice: Subject to any disclaimer, the term of this patent is extended or adjusted under 35 U.S.C. 154(b) by 0 days.

(21) Appl. No.: 14/071,216

(22) Filed: Nov. 4, 2013

(65) Prior Publication Data

US 2014/0066159 A1 Mar. 6, 2014

Related U.S. Application Data

(63) Continuation of application No. 13/625,077, filed on Sep. 24, 2012, now Pat. No. 8,574,055, which is a continuation-in-part of application No. 13/472,729, filed on May 16, 2012, now Pat. No. 8,579,694, which (Continued)

(51) Int. Cl.
*A63F 9/24* (2006.01)
*A63F 13/00* (2014.01)
*G06F 17/00* (2006.01)
*G06F 19/00* (2011.01)
*G07F 17/32* (2006.01)
*G06Q 40/00* (2012.01)
*G06Q 40/04* (2012.01)
*G07C 15/00* (2006.01)
*G06Q 40/02* (2012.01)

(52) U.S. Cl.
CPC .......... *G07F 17/329* (2013.01); *G07F 17/3288* (2013.01); *G07F 17/32* (2013.01); *G06Q 40/00* (2013.01); *G06Q 40/04* (2013.01); *G07C 15/006* (2013.01); *G06Q 40/025* (2013.01)
USPC ................... 463/17; 463/13; 463/19; 463/21; 463/25; 273/292

(58) Field of Classification Search
CPC ....... A63F 3/0625; G07C 15/00; G07F 17/32; G07F 17/3267
USPC ............... 463/13, 17, 19, 21, 25, 42; 273/292
See application file for complete search history.

(56) References Cited

U.S. PATENT DOCUMENTS 4,583,736 A 4/1986 Lorraine
4,796,890 A 1/1989 Snyder (Continued)

FOREIGN PATENT DOCUMENTS

WO WO 9512181 A1 * 5/1995

*Primary Examiner* — Adetokunbo O Torimiro
(74) *Attorney, Agent, or Firm* — Scheinberg & Associates, PC; John Kelly

(57) ABSTRACT

Methods for direct wagering and lottery wagering on real-world events including outcomes based on fantasy sports league performance. One method according to an embodiment of the present invention includes selecting a set of variables, each variable representing a time-varying value capable of having a fixed value at a specified time. For each variable, the method includes selecting a range of values for the fixed value of the variable at the specified time, dividing the range of values into a set of n increments, randomly assigning a lottery number from a set of lottery numbers, 1 to n, to each increment, selecting a winning lottery number from the set of lottery numbers based on correlating the fixed value of the variable at the specified time with the increment associated with the winning lottery number; and determining a set of winning lottery numbers from the winning lottery numbers selected for each variable.

24 Claims, 13 Drawing Sheets

Related U.S. Application Data is a continuation of application No. 12/940,643, filed on Nov. 5, 2010, now Pat. No. 8,182,328, which is a continuation-in-part of application No. 12/832,794, filed on Jul. 8, 2010, now abandoned, which is a continuation-in-part of application No. 12/705,375, filed on Feb. 12, 2010, now Pat. No. 7,887,406, which is a continuation of application No. 10/606,100, filed on Jun. 25, 2003, now Pat. No. 7,674,170.

(56) References Cited

U.S. PATENT DOCUMENTS

| | | |
|---|---|---|
| 4,962,950 A | 10/1990 | Champion |
| 5,332,218 A | 7/1994 | Lucey |
| 5,340,119 A | 8/1994 | Goldfarb |
| 5,374,060 A | 12/1994 | Goldberg |
| 5,518,239 A | 5/1996 | Johnston |
| 5,613,679 A | 3/1997 | Casa et al. |
| 5,722,890 A | 3/1998 | Libby et al. |
| 5,795,226 A | 8/1998 | Yi |
| 5,830,068 A | 11/1998 | Brenner et al. |
| 5,836,816 A | 11/1998 | Bruin et al. |
| 5,888,136 A | 3/1999 | Herbert |
| 6,004,206 A | 12/1999 | Fabri |
| 6,015,345 A | 1/2000 | Kail |
| 6,058,379 A | 5/2000 | Odom et al. |
| 6,078,904 A | 6/2000 | Rebane |
| 6,120,376 A | 9/2000 | Cherry |
| 6,186,502 B1 | 2/2001 | Perkins |
| 6,280,324 B1 | 8/2001 | Tenebaum |
| 6,309,307 B1 | 10/2001 | Krause et al. |
| 6,331,148 B1 | 12/2001 | Krause et al. |
| 6,416,408 B2 | 7/2002 | Tracy et al. |
| 6,497,408 B1 * | 12/2002 | Walker et al. ............... 273/138.1 |
| 6,527,270 B2 | 3/2003 | Maksymec et al. |
| 6,620,045 B2 | 9/2003 | Berman et al. |
| 6,702,672 B1 | 3/2004 | Angell et al. |
| 6,786,824 B2 | 9/2004 | Cannon |
| 6,910,965 B2 | 6/2005 | Downes |
| 7,233,922 B2 | 6/2007 | Asher et al. |
| 7,674,170 B2 | 3/2010 | Odom et al. |
| 7,693,781 B2 | 4/2010 | Asher et al. |
| 7,699,701 B2 | 4/2010 | Corbo |
| 2001/0049305 A1 * | 12/2001 | Riendeau et al. ............... 463/42 |
| 2003/0027629 A1 | 2/2003 | Pimienta |
| 2004/0029627 A1 | 2/2004 | Hannan et al. |
| 2004/0043810 A1 | 3/2004 | Perlin et al. |
| 2004/0048656 A1 | 3/2004 | Krynicky |
| 2004/0266513 A1 | 12/2004 | Odom et al. |
| 2005/0033649 A1 | 2/2005 | Okada |
| 2005/0102223 A1 | 5/2005 | Vlazny et al. |
| 2005/0176491 A1 | 8/2005 | Kane et al. |
| 2007/0293308 A1 | 12/2007 | Jackson et al. |
| 2008/0182649 A1 | 7/2008 | Marshall et al. |
| 2008/0234051 A1 | 9/2008 | McNutt et al. |

* cited by examiner

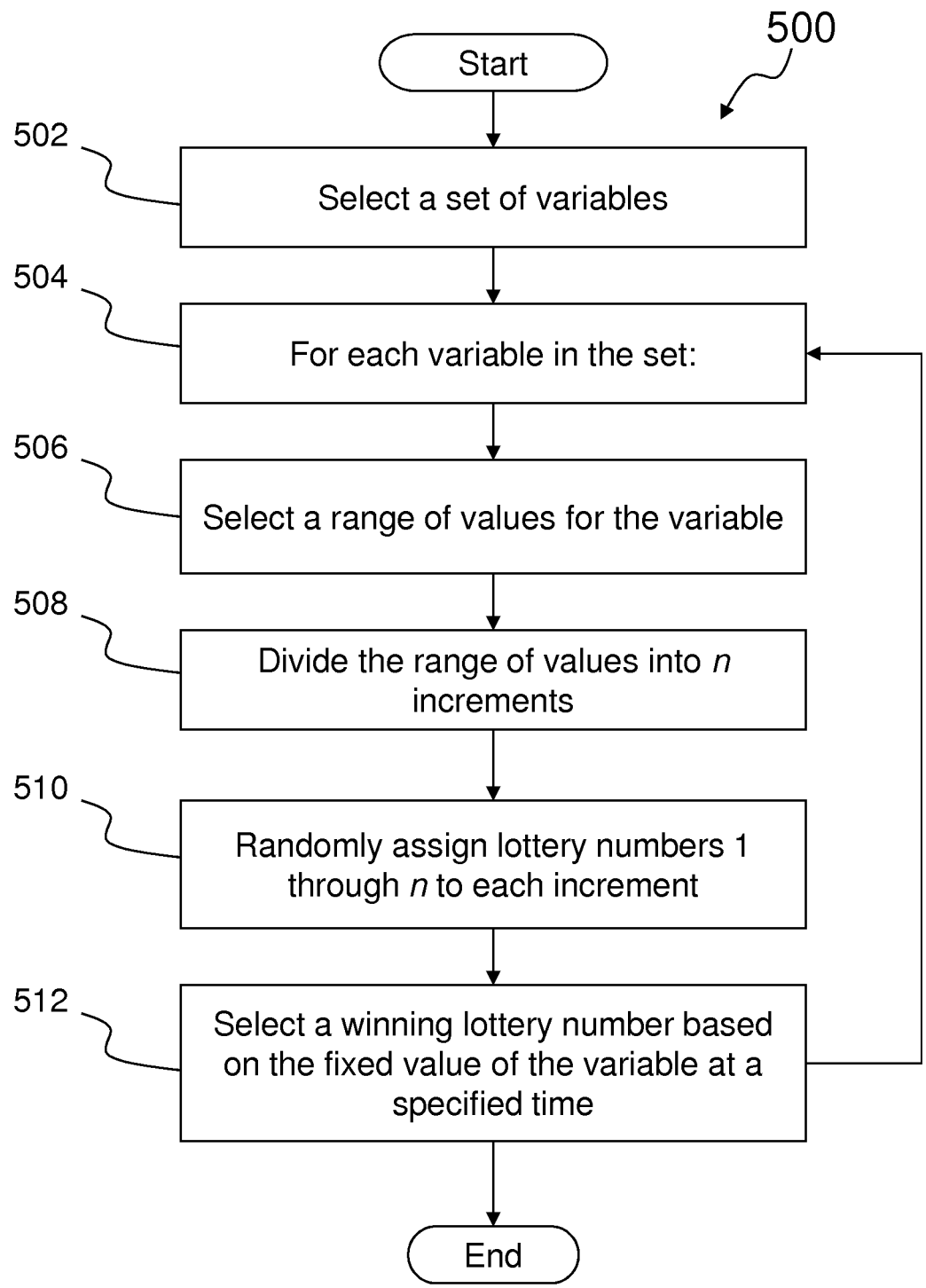

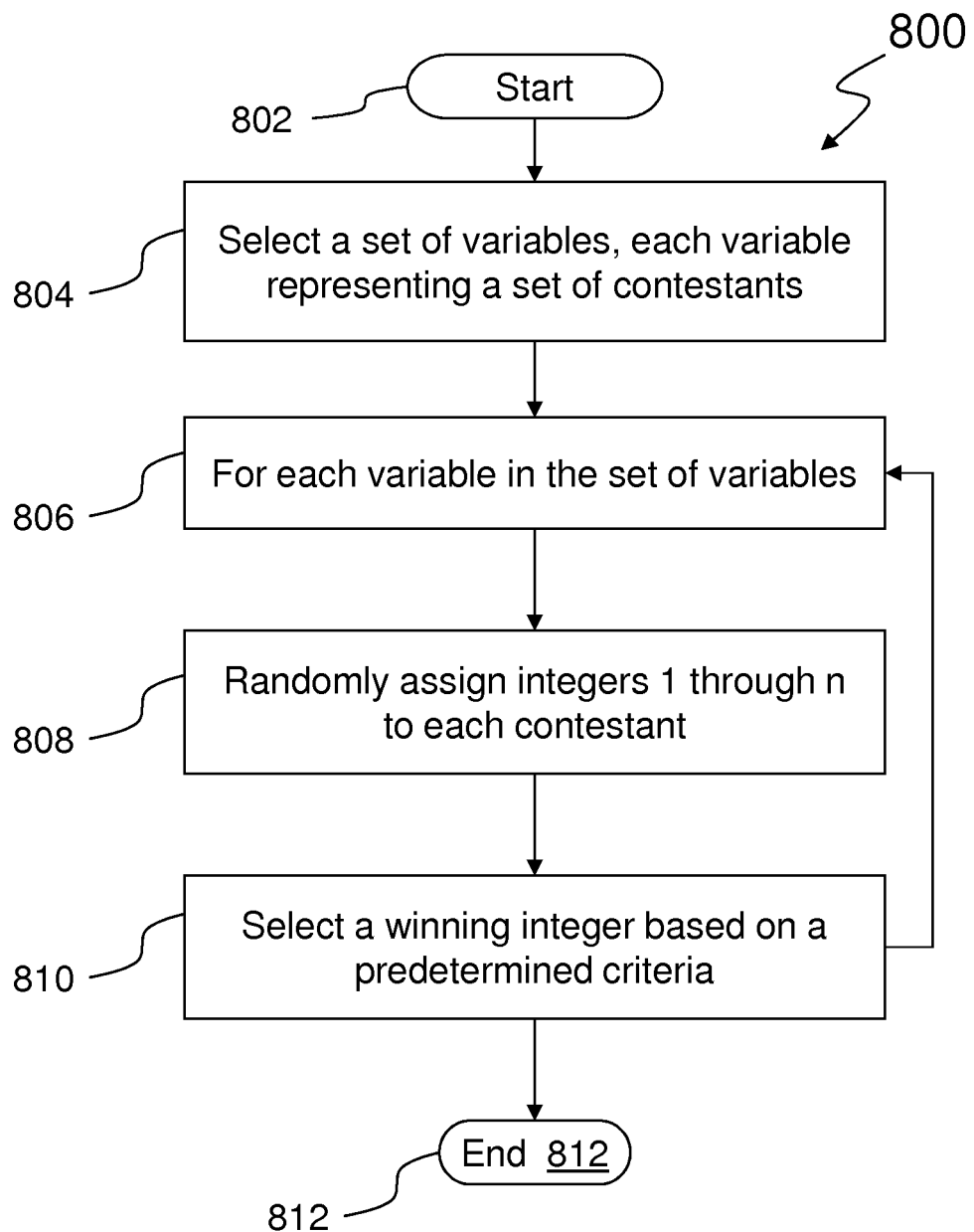

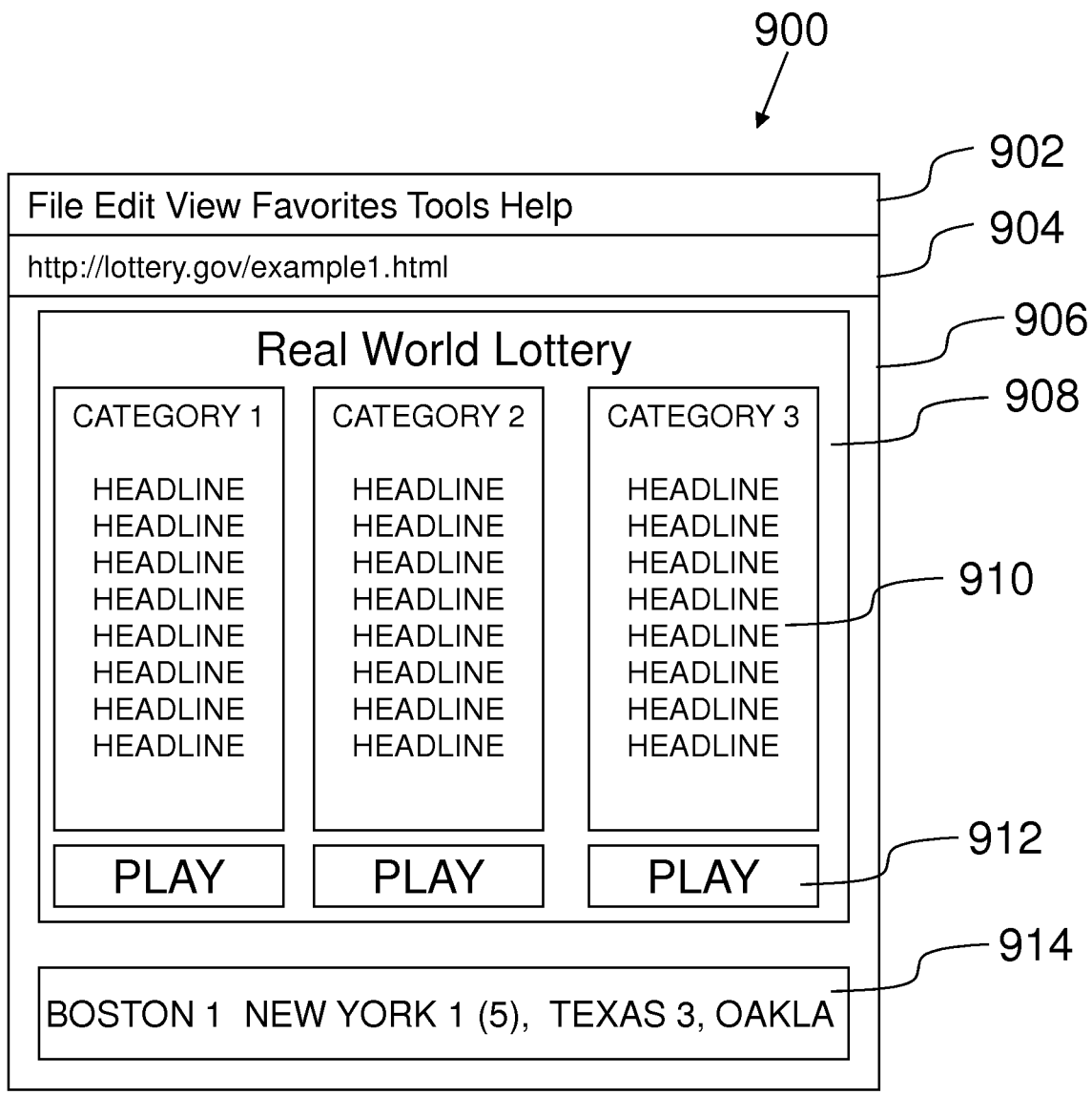

METHOD OF LOTTERY WAGERING ON REAL-WORLD EVENTS

This application is a continuation of U.S. patent application Ser. No. 13/625,077, filed Sep. 24, 2012, which is a continuation-in-part of U.S. patent application Ser. No. 13/472,729, filed May 16, 2012, which is a continuation of U.S. patent application Ser. No. 12/940,643, filed Nov. 5, 2010, now U.S. Pat. No. 8,182,328, which is a continuation-in-part application of U.S. patent application Ser. No. 12/832,794, filed on Jul. 8, 2010, which is a continuation-in-part application of U.S. patent application Ser. No. 12/705,375, filed on Feb. 12, 2010, now U.S. Pat. No. 7,887,406, which is a continuation application of U.S. patent application Ser. No. 10/606,100, filed on Jun. 25, 2003, now U.S. Pat. No. 7,674,170, all of which are hereby incorporated by reference.

FIELD OF THE INVENTION

The present invention pertains generally to the field of wagering systems. More particularly, the new and useful invention claimed in this document pertains to a method for wagering on an actual, real-world event or competition. The present invention is particularly, but not exclusively, useful for awarding a prize to one or more players choosing to place one or more wagers particularly through a lottery system or network. The present invention is also useful for buying, selling, or trading lottery-based wagers among lottery players and distributors.

BACKGROUND OF THE INVENTION

Within the United States, many states have enacted legislation to permit lotteries. Lotteries include a variety of games that, for a while, were popular and successful. A lottery is recognized as a form of gambling or gaming, allowing players to wager on the chance to win a valuable prize. In a typical lottery, players buy tickets with a series of characters or numbers from authorized vendors at fixed prices. Neither the characters nor numbers on the tickets generate inherent excitement. At a subsequent drawing, winning characters or numbers are selected on an unpredictable and random basis for comparison with the players' characters and numbers. Players who satisfy the requisite matching of characters or numbers win prizes. In the familiar and typical lottery process, a computer generates a randomized prize data stream which includes a limited number of win/lose outcomes. Each outcome is assigned to a lottery ticket, and each ticket contains one or more game chances, which yield the assigned outcome. A player cannot change the ticket outcome. A player merely scratches off certain areas of the ticket in accordance with rules of the game to reveal the outcome, or waits until the computer-generated outcome is announced at some future date. Typically, a player purchases a lottery ticket located in stores that have apparatus for entering the choices of a player. The apparatus is generally in electronic communication with a central computer. A player may mark the characters or numbers he wishes to enter as the players' choices on a computer-scannable or computer-readable entry form. The player pays a fee, a clerk inserts the ticket into the apparatus, and the information is recorded in the central computer. After wagering has been closed, a variety of methods are used to determine the winning range of numbers or characters: bouncing balls with numbers written on the balls and computer driven selection processes are the most common.

Limitations on the current lottery approaches have become evident.

Lottery systems currently in effect generate no inherent enthusiasm by or on the part of the players. Lottery outcomes are not decided by real-world events, but rather by sterile computer programs, or by a tub of ping-pong balls. There is nothing for a player to watch or cheer for. Accordingly, many state-operated lotteries have reached market saturation, if not stagnation.

The real world presents a wide range of events that enthusiasts would like to wager on. A non-exclusive listing of such real-world events includes political elections, racing events such as automobile races, motorcycle races, horse races, and similar events, as well as a wide range of sporting events. Given the fascination of the American public for theater and movies, even the Academy Awards® and the Oscar® presentations present an opportunity for wagering. Real-world events add drama and interest not achieved through typical lottery systems or networks.

Current lotteries fail to attract enthusiasts for the frequent and highly publicized events in the sporting world, the political world, or the world in general. A large, extant, already existing but untapped audience base exists for a number of sporting events, including as a non-exclusive example, automobile racing. National and worldwide media coverage is provided for such events. Thus, the NASCAR® Winston Cup Series is a racing model that holds great potential as a venue for a more modern wagering process through a lottery system.

Enthusiasts would become players in a lottery because they are dramatically interested in the real world outcomes of events of interest to them. For example, the NASCAR® Winston Cup Series begins in mid-February with the Daytona 500 Race, and continues almost every weekend until thirty-six or more races are completed throughout the United States. The interest among consumers in NASCAR® racing is evident by the extent to which major corporations sponsor race teams and the racing events. In a typical NASCAR® race, each race week begins with one or two days of timed laps that are conducted until the fastest 43 cars qualify for the actual or subsequent race. Qualifying laps end about forty-eight hours before the actual race. The result is a major sporting spectacle, frequently featuring 150,000 people in attendance, while perhaps five million households watch on television, and millions worldwide listen on radio. Significantly, NASCAR® features more corporate sponsors among the Fortune 500 companies than any other sport. Fan support among those interested in NASCAR® racing is legendary. Presently, NASCAR® boasts forty million fans. The NASCAR® Winston Cup Series is the second highest rated regular season sport on television.

Lotteries following the conventional dreary mode of wagering are losing the hoped-for income generating status that state governments anticipated. As excitement has waned, lottery income has decreased. Competition for entertainment and gaming dollars is on the increase. Lottery players are older, and lotteries are not attracting younger players. On the other hand, using just one of the competitions for which the present invention is useful, NASCAR® demographics indicate that 32% of NASCAR® fans are 18-34 years of age, and 26% are between 35-44 years of age. Brand loyalty among those fans is intense. These demographics, statistics and real-world facts suggest a way to use the present invention to breathe new life and entertainment into lotteries in participating states.

As indicated, a previously unaddressed need exists in the industry for a new, useful and improved method for conducting wagers through a lottery system that is capable of rejuvenating enthusiasm for lotteries in general. Particularly, there is a significant need for a method and system that allows enthusiasts for one or more competitions to become lottery players who wager on real-world or actual events and competitions. The present invention for a method for lottery wagering on actual events addresses these needs, and is useful for providing a relevant and entertaining form of wagering, whereby the player can incorporate his or her insight, knowledge, experience and interest into the gaming activity.

The advantages, objects and features of the present invention for such a method and system will become apparent to those skilled in the art when read in conjunction with the following description, drawing figures and appended claims.

SUMMARY OF THE INVENTION

Given the conventional solutions for attempting to solve the problems associated with lotteries, it would be desirable, and of considerable advantage, to provide a method for conducting wagers through a lottery that involves real-world events.

The present invention provides numerous advantages in connection with a method for conducting wagers through a lottery. At least one of the advantages of the present invention is that the results are based on real-world, actual events.

Another advantage of the present invention is that it allows an enthusiast who wants to become a player in connection with a given competition to select a range of numbers or characters, or have the lottery system randomly choose a range of numbers or characters.

Yet another advantage of the present invention is that it allows wagers to be placed on pre-qualifying events that are conducted prior to a final event.

Still another advantage of the present invention is that it provides for identifying rankings or preliminary rankings as a predicate to conducting a final event. The rankings or preliminary rankings may be assembled into data in the form of pre-qualifying data.

A primary object of the invention is to provide a lottery system that enables results to be rendered on any number of media display devices, preferably in real-time, where one or more prizes may be awarded either at a retailer in the same manner, and with the same convenience, as current scratch-off lottery paper tickets, or electronically.

It is yet another object and advantage of the present invention to enhance current lottery systems by increasing sales and profits, and providing players with more competitive entertainment alternatives.

It is still another object and advantage of the present invention to provide a wagering system in which any number of competitions may be offered for purposes of wagering.

Yet another object and advantage of the present invention is that it builds on already extant player enthusiasm for a given or particular competition.

Still another advantage of the present invention is a method for conducting wagers through a lottery that is easy to use and to practice, and is cost effective for the intended purposes.

These objects and advantages are achieved in the present invention by providing a method for lottery wagering on actual events. The method according to the present invention includes assembling pre-qualifying data, $D_{PQ}$, for preliminary participants after conclusion of a pre-qualifying event of a phased competition, and assembling concluding data, $D_C$, for final participants after conclusion of a final event of a phased competition. A winner or winners of the final event are determined after the final event based on the concluding data $D_C$. The winners' concluding data is then correlated to the winners' pre-qualifying data $D_{PQ}$. The winning lottery data, $D_L$, is determined from the correlation step.

Assembling the pre-qualifying data $D_{PQ}$ for preliminary participants can consist of assembling the preliminary participants' preliminary ranking data and may comprise collecting, collating, correlating, or mathematically manipulating the preliminary ranking data. Assembling the concluding data $D_C$ for final participants can consist of assembling the final participants' concluding ranking data, which may comprise collecting, collating, correlating, or mathematically manipulating the concluding ranking data.

Wagering data, $D_W$, is selected as a subset from the set of pre-qualifying data $D_{PQ}$ prior to conclusion of a pre-qualifying event. For example, if the pre-qualifying data consists of a set of numbers, then the wagering data may consist of a subset of n numbers selected from that group of numbers. The number of winners chosen from the final event would then be equal to n, and the n winners' respective pre-qualifying numbers would make up the set of n winning lottery numbers, $D_L$.

Players of the lottery of the present invention communicate with a lottery distributor who operates the lottery. A communication link between the distributor and player is used for communications. The communication link between the distributor and player can be a ticket, telephone link, radio frequency link, computer network, Internet, or World Wide Web communication link. This communication link is either encrypted or otherwise secured.

Optionally the present invention further includes the selection of a subset of wagering data from a set of concluding data. For example, in addition to selecting pre-qualification numbers as the wagering data, the player optionally selects an additional number representing some form of concluding data, such as the winner of a race. The winning lottery data is then comprised of a combination of the pre-qualification data and concluding data.

Wagering data is either selected manually by the player or randomly by the distributor for the player, where the distributor is the house, bank or other entity operating the lottery. Random selection of wagering data is accomplished mechanically or by computer and associated software means. The random wagering data is optionally provided to the player on a conventional "scratch-off" type ticket.

At the conclusion of the final event, wagering data $D_W$ is compared to the winning lottery data $D_L$ and prizes are awarded to successful lottery players.

Optionally, the present invention provides a second lottery phase for unsuccessful players. In the second lottery phase, the unsuccessful player enters the original wagering data $D_W$ to the lottery distributor, along with the player's account information, and the distributor randomly selects a winner or winners from the entrants. Prizes, preferably in the form of merchandise, are awarded to winners of the second lottery phase.

Optionally, the method of the present invention includes "real-time" trading of wagering data prior to the conclusion of the final event. Players designated as real-time players may trade and revise wagers prior to the conclusion of the final event.

In an alternative embodiment of the invention, the pre-qualifying data is randomly shuffled by the distributor and assigned to the final participants. In this embodiment, winners of the final event are chosen based on the concluding data. Correlation of the winners to their respective shuffled pre-qualifying data, $D_{PQS}$, is then performed to determine the winning lottery data, $D_L$. The winning lottery data, $D_L$, consists of the winners' $D_{PQS}$.

The present invention is further a method of lottery wagering on a phased vehicle race competition having a pre-qualifying event phase, race starting position data, and a final race phase. The method comprises selecting n numbers from a set of race starting position numbers as wagering numbers, prior to conclusion of the pre-qualifying event. The starting position numbers for each final race participant are determined after the pre-qualifying event. Then, n race winners are chosen after the final race phase based upon their concluding race data. The lottery winning numbers consist of the n race winners' n starting position numbers.

The invention is also a method of lottery wagering on a phased competition which includes selecting a subset of wagering data $D_W$ from a set of pre-qualifying data $D_{PQ}$ prior to conclusion of a pre-qualifying event by communicating with a lottery distributor over a communication link, such as by ticket, landline telephone, radio frequency, computer network, Internet, or World Wide Web connection. Additionally, the method includes assembling pre-qualifying data $D_{PQ}$ for preliminary participants after conclusion of a pre-qualifying event of a phased competition, assembling concluding data $D_C$ for final participants after conclusion of a final event of a phased competition, determining at least one winner of the final event based on the concluding data $D_C$, and correlating the concluding data $D_C$ of a winner to the pre-qualifying data $D_{PQ}$ of the winner. Winning lottery data $D_L$ is based on the correlating step. Finally, lottery data is optionally communicated between a distributor and a central hub over a communication link such as a landline telephone, radio frequency link, computer network, Internet, or World Wide Web connection.

The present invention is still further a system for lottery wagering on a phased competition. The system comprises a distributor for operating the lottery and distributing lottery prizes and a communication link between the distributor and a lottery player. The distributor has a storage medium for storage of lottery related data, means for correlating phased competition concluding data to phased competition pre-qualifying data, and means for random generation of wagering data for players. Preferably, the distributor operates via a computer and associated software. The communication link between the distributor and player preferably comprises possessing a ticket, telephone, or radio frequency link such as through a mobile telephone, computer network, Internet, or World Wide Web.

The present invention is also a system for lottery wagering on a phased competition including a hub for sharing information amongst distributors. The distributor operates a lottery and distributes lottery prizes and includes a storage medium for storage of lottery-related data, means for correlating phased competition concluding data to phased competition pre-qualifying data, and a communication link for communication between the distributor and a lottery player. Each distributor then communicates via a communication link with a central hub, where the hub operates as a super-distributor for coordinating information from multiple distributors. The hub consists of a programmable computer and memory suitable for managing data. The communication link between the hub and a distributor is a landline telephone, radio frequency link, computer network, Internet, or World Wide Web.

It will become apparent to one skilled in the art that the claimed subject matter as a whole, including the structure of the system, and the cooperation of the elements of the system, combine to result in a number of unexpected advantages and utilities. The advantages and objects of the present invention will become apparent to those skilled in the art when read in conjunction with the accompanying following description, drawing figures, and appended claims.

The foregoing has outlined broadly the more important features of the invention to better understand the detailed description which follows, and to better understand the contribution of the present invention to the art. Before explaining at least one embodiment of the invention in detail, it is to be understood that the invention is not limited in application to the details of construction, and to the arrangements of the components, provided in the following description or drawing figures. The invention is capable of other embodiments, and of being practiced and carried out in various ways. Also, the phraseology and terminology employed in this disclosure are for the purpose of description, and should not be regarded as limiting.

As those skilled in the art will appreciate, the conception on which this disclosure is based readily may be used as a basis for designing other structures, methods, and systems for carrying out the purposes of the present invention. The claims, therefore, include such equivalent constructions to the extent the equivalent constructions do not depart from the spirit and scope of the present invention. Further, the abstract associated with this disclosure is neither intended to define the invention, which is measured by the claims, nor intended to be limiting as to the scope of the invention in any way.

The novel features of this invention, and the invention itself, both as to structure and operation, are best understood from the accompanying drawings, considered in connection with the accompanying description of the drawings, in which similar reference characters refer to similar parts, and in which:

BRIEF DESCRIPTION OF THE DRAWINGS

FIG. 5 is a flowchart depicting a process for randomizing real-world events for use in a lottery event in accordance with one or more embodiments of the present invention;

FIG. 8 shows a flowchart 800 depicting a process for randomizing real-world events for use in a lottery event in accordance with one or more alternative embodiments of the present invention;

FIG. 9 shows a web page depicting an exemplary user interface for a real world lottery in accordance with one or more embodiments of the present invention.

DESCRIPTION OF A PREFERRED EMBODIMENT

Figure 1:
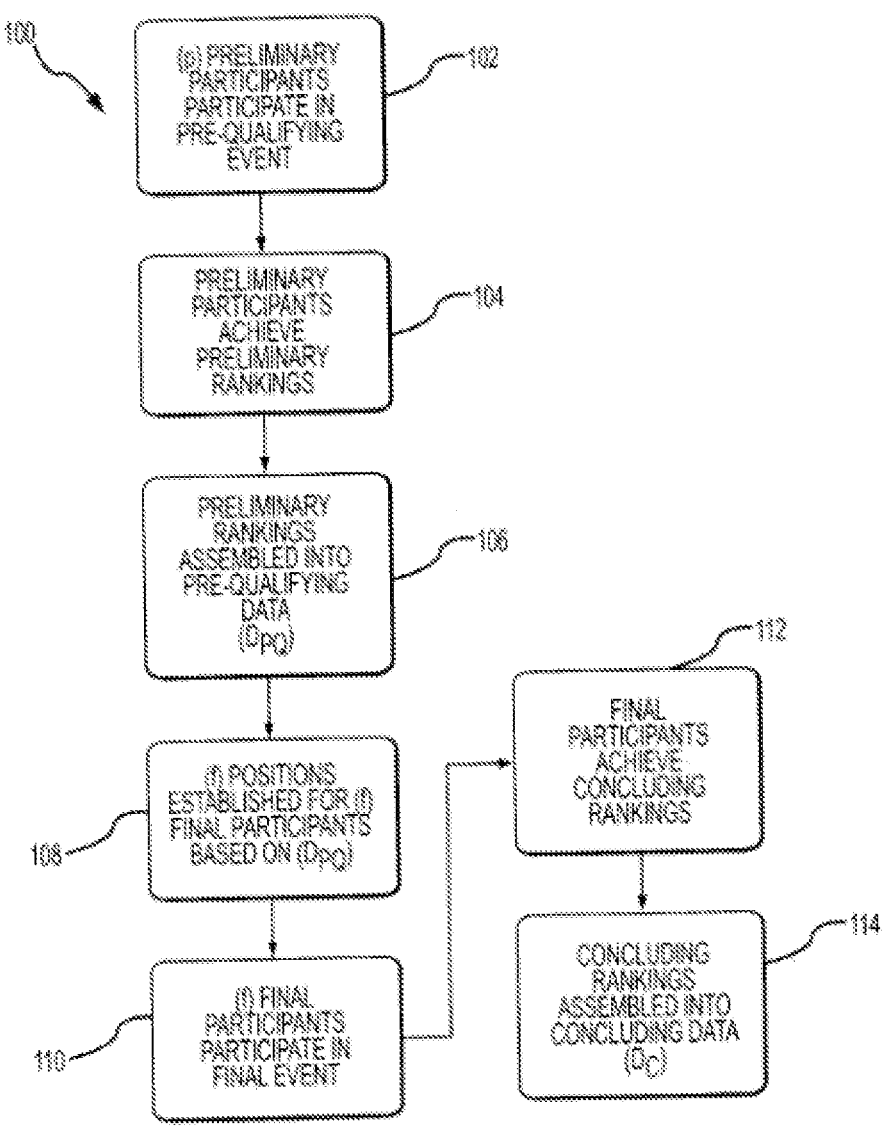
FIG. 1 is a flowchart depicting a phased competition applicable in accordance with the present invention for a method for lottery wagering on actual events.

Briefly, the present invention provides a method for lottery wagering based upon actual events. The method involves determining winning lottery data based on a correlation between winners of a final event and the pre-qualification data of those winners from a pre-qualifying event.

In this document, the term "event" refers to a contest, competition, performance, occurrence, or other event. The term "pre-qualifying event" refers to an event preceding a final event. During a pre-qualifying event, one or more persons, animals, machines, or other animate or inanimate actors or devices, either separately or in combination (individually, a "preliminary participant"), participate in an event. As a result of a pre-qualifying event, one or more preliminary participants may achieve or be assigned a range of positions, numbers, characters, results, arrangements, relative placements, situations, standings, or other rankings (individually, a "ranking") called a "preliminary ranking." The ranking or preliminary ranking may be collected, collated, correlated, or mathematically manipulated (collectively, "assembled") into data or results referred to as "pre-qualifying data."

A preliminary ranking or pre-qualifying data may establish for one or more preliminary participants a position, result, arrangement, relative placement, situation, standing, or other ranking (individually, a "position") for one or more final participants, formerly preliminary participants, at commencement of a subsequent event called, individually, a "final event." As a result of a final event, one or more participants may achieve or be assigned a range of positions, results, arrangements, relative placements, situations, standings, or other rankings (individually, a "concluding ranking") that may be assembled into data or results about the final event as "concluding data."

The step-by-step occurrences beginning with a pre-qualifying event, and ending with a final event, collectively are described in this document as a "phased competition." A phased competition may consist of a single event having two or more phases, or a series of related events, where an earlier event or events constitute the pre-qualifying event and a later event or events constitute the final event as might occur over the course of a season.

It will be apparent to those of skill in the art that the definitions of what constitutes the "pre-qualifying event," "final event," "pre-qualifying data" and "concluding data" are limited only by the events surrounding, and the data generated by, any particular phased competition.

A preliminary ranking may be of interest to one or more persons (individually, an "enthusiast"). A preliminary ranking may be of interest to one or more persons who, or devices that, confirm and record a preliminary result or preliminary ranking (individually, a "comparator"). Likewise, a concluding ranking also may be of interest to one or more enthusiasts and one or more comparators. An enthusiast may or may not witness a pre-qualifying event or a final event.

An enthusiast may elect to wager, and thus become a "player," in connection with any number of combinations and permutations of possible or probable occurrences (individually, a "possibility") in connection with a participant's pre-qualifying data or concluding data. A player may elect to place one or more wagers on one or more possibilities to occur, at any time before occurrence of a pre-qualifying event, and occurrence of a preliminary ranking. A player also may elect to place one or more wagers on one or more possibilities that may or may not occur, at any time before occurrence of a pre-qualifying event and occurrence of a final outcome. As will be evident to those skilled in the art, a player may elect to place one or more wagers on one or more possibilities that may or may not occur at any time in connection with a pre-qualifying event and a final event.

A player may elect to wager with any number of potential sources of distributors of winnings and prizes (individually, a "distributor") who operate a "lottery." A distributor may include as non-exclusive examples, a central bank or banker (a "house"), other players, or a state-operated system. A "hub" is a central administrator. Each distributor optionally communicates with the hub, and vice versa, so that information can be shared with the hub and with all other distributors. A "lottery" is a game, process or methodology whereby players place wagers on possibilities in hopes of receiving a prize at the conclusion of the lottery.

Communication between players and a distributor occurs via a "communication link." A communication link comprises either a hardwired or wireless communication link. A nonexclusive list of examples of communication links include: conventional landline telephone communication links, radio frequency (RF) communication links, and electronic communication links such as those implemented in computer networks. Where legally permissible, the distributor may operate via a network such as an Internet or World Wide Web (www) site.

The player interacts with the lottery distributor by data entry through a conventional keyboard, keypad or touch-screen, and/or verbally—in the instance where the communication link is a telephone, associated with the communication link. The player alternatively purchases a preprinted paper ticket, which the player saves until the conclusion of the final event. The distributor provides information to the player visually and/or aurally over conventional display and audio devices associated with the lottery communication link.

Data is stored, permanently or temporarily, as necessary by the distributor throughout the course of a lottery on a "storage medium," preferably in the form of a database. Storage media include, but are not limited to, hard and soft storage media such as paper media and computer readable media.

Winnings and prizes paid and distributed on successful wagers may be in the form of money, merchandise, scripts, vouchers, and other items of actual or perceived value (individually, a "prize"). As used in this document, a player who becomes eligible to receive a prize from a distributor is a "successful player." Successful wagers are announced via the communication link between the player and distributor, by radio, television, or other communication means.

Attention is now turned to the figures. A phased competition is depicted in FIG. 1 and is described here first to facilitate understanding of the present invention for a method of lottery wagering and its application to an actual event. A discussion of the methodology of the invention follows with reference to FIGS. 2A and 2B. Further, to facilitate an understanding of the concepts, variables, and processes of the invention, an example of the invention applied to an actual phased competition, a NASCAR® race, is provided in parallel with a detailed explanation of the invention. The NASCAR® race example is presented herein only as one application of the methodology of the invention and is not to be construed as limiting the invention to any particular phased competition.

Referring to FIG. 1, a flowchart illustrating a phased competition having application in accordance with the present invention for lottery wagering on actual events is shown and generally designated 100. In a typical phased competition, such as the familiar NASCAR® race, the competition begins with a pre-qualifying event, in which a particular number (p) of preliminary participants participate, 102. In a NASCAR® race, the pre-qualifying event consists of a group of preliminary participants, typically p=50 race cars and associated drivers, who run qualifying laps to determine qualifying times for each car-driver combination. These qualifying times relate largely to the speed at which the car and driver are able to negotiate the racetrack.

Preliminary rankings 104 comprise data regarding, or related to, the performance of each preliminary participant. The next step in a typical phased competition is the assembly of prequalifying data, ($D_{PQ}$), from the preliminary rankings, 106. In the NASCAR® race example, pre-qualifying data may comprise a combination of speed and other performance data, or it may comprise speed data alone, from the pre-qualifying event.

Once the pre-qualifying data is assembled, positions are established for a predetermined number, (f) of final participants to participate in the final event, 108, where f<p. For example, in a NASCAR® race, forty-three (f) of the fifty (p) preliminary participants having the most favorable pre-qualifying data are chosen to participate in the final event. These f final participants are positioned in some manner for participation in the final event. In a NASCAR® event, the forty-three cars are positioned in a starting lineup according to their pre-qualifying data, such that the car having the most favorable pre-qualifying data has the most advantageous starting position for the race.

Next, the f final participants participate in the final event, 110. In the NASCAR® race example, the final event would be the actual race. Upon conclusion of the final event, each of the f final participants achieves a concluding ranking, 112. A concluding ranking of a NASCAR® race may consist for example, of any type of data regarding or related to the performance of each driver in the race. These concluding rankings are assembled into concluding data ($D_C$). For example, in a NASCAR® race, the concluding data may comprise an assembly of race-related data, or simply the place in which each race participant finished the race.

Figure 2A:
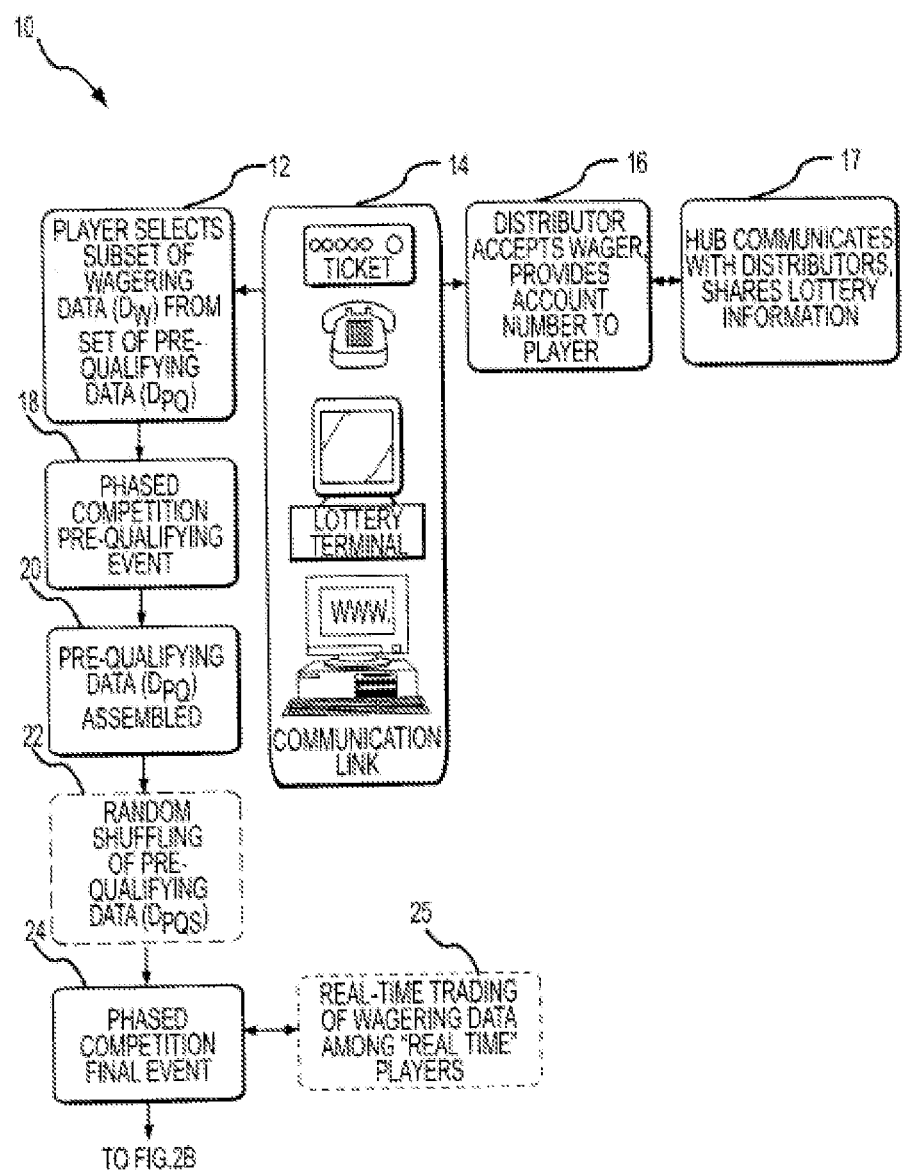
FIG. 2A is the first portion of a flowchart of a preferred embodiment of the present invention for a method for lottery wagering on actual events.
Figure 2B:
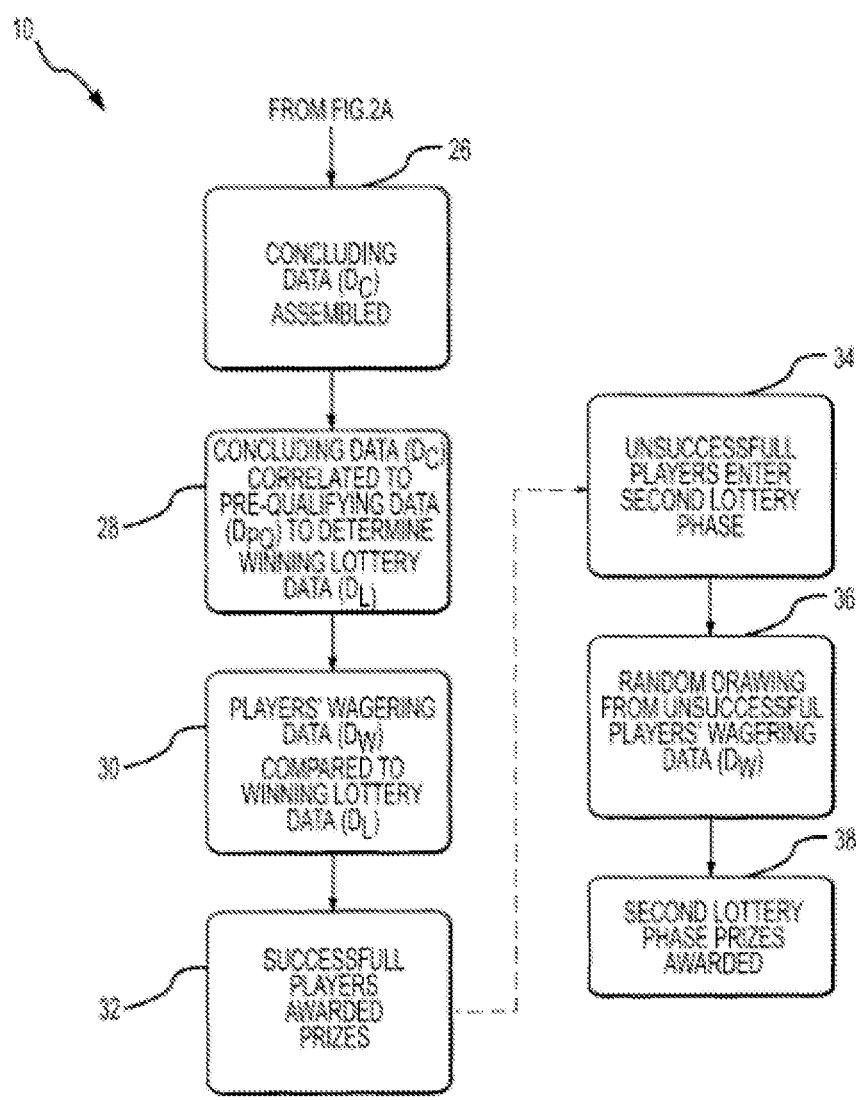
FIG. 2B is the second portion of the flowchart of FIG. 2A.

The present invention for a method of lottery wagering on actual events is now described as it is applied to a phased competition. Referring in combination to FIGS. 2A and 2B, a flowchart illustrating the methodology of the present invention is shown and generally designated 10. The method for lottery wagering on actual events begins with a player selecting a subset of wagering data ($D_W$) from a set of pre-qualifying data ($D_{PQ}$) that will ultimately be assembled from rankings of a pre-qualifying event of a phased competition, 12. (See also FIG. 1.) The parameters for $D_W$, e.g., size and type of data, are predefined such that each player selects $D_W$ having the same parameters. The player is permitted to select $D_W$ during a predetermined time period preceding the pre-qualifying event of the phased competition.

Wagering data, $D_W$, is selected by the player via communication link 14 that is in communication with a distributor 16. The distributor 16 operates the lottery, including the associated data storage, random data generation, player account management, player interaction, winning lottery data determination, and award of prizes through a combination of suitable human resources, computer, software and data processing means.

Each distributor 16 optionally shares information with a central administrator, or hub 17. Each distributor 16 communicates with the hub 17, and vice versa, so that information can be shared with the hub and with all other distributors. Hub 17 consists of a programmable computer or other data processing and control mechanism, having suitable memory and data storage capacity. Communication between distributors and hub 17 occurs over a secure communication link, being encrypted or otherwise secured. The communication link is accomplished via landline telephone, radio frequency, computer network, Internet, World Wide Web, or other suitable communication means.

The selection of $D_W$ is performed either manually by the player or by random assignment by the lottery distributor. Random selection of $D_W$ is provided by computer in the circumstance where the distributor operates the lottery via computerized means, such as the Internet, World Wide Web, lottery terminals connected to a central computerized system, or other computerized system by a suitable software algorithm or algorithms. Alternatively, random selection of $D_W$ is provided by way of purchasing a paper ticket, such as the familiar "scratch-off" type lottery ticket, where $D_W$ is pre-printed on the ticket as provided by a random number generation method. Each player's wagering data is stored on a storage medium associated with the lottery distributor 16.

In the NASCAR® race example, players select a subset of n numbers, where n≥1 as predefined for the lottery—for example, n=5, from the set of pre-qualifying data $D_{PQ}$. In this example, the $D_{PQ}$ data are related to the starting lineup positions of the f, or 43, final participants in the final event, or race. Thus, $D_{PQ}$ are the numbers 1 through 43, and the player selects n of those numbers as the wagering data, $D_W$. As an example, a player may select, or be randomly assigned, the numbers 4, 17, 19, 37, and 40 as the wagering data, $D_W$.

A variation of the above NASCAR® race example allows players to select as wagering data a subset of n numbers from the set of pre-qualifying data $D_{PQ}$, as well as m "favorite" participant(s) to win the final event, where m≥1 as predefined for the lottery and is selected from concluding data. The winning lottery data is then a combination of the set of n winners' respective pre-qualifying data, $D_{PQ}$, and m concluding data, $D_C$.

After the predetermined time period for selecting $D_W$ has elapsed, the phased competition, pre-qualifying event occurs, 18. At the conclusion of the pre-qualifying event, pre-qualifying data, $D_{PQ}$, is assembled for each preliminary participant, 20. $D_{PQ}$ in the NASCAR® race example consists of the starting lineup position of each of the (f) participants chosen to participate in the final race event. Therefore, $D_{PQ}$ are the numbers 1 through 43, where number 1 is the most favorable starting lineup position, number 2 is the second most favorable starting lineup position, etc. The number 1 thus represents the car and driver who achieved the first starting lineup position, such as the car carrying decal number 89 driven by John Doe. Number 2 represents the car and driver who achieved the second lineup position, such as the car carrying decal number 77 driven by Jane Roe. This information is available to the public and any players of the lottery. $D_{PQ}$ is stored on a storage medium associated with the lottery distributor.

In an alternative embodiment of the invention, the pre-qualifying data, $D_{PQ}$, is randomly shuffled, 22, by a random shuffling mechanism which generates and stores on a storage medium an altered data set $D_{PQS}$. $D_{PQS}$ is stored on a storage medium associated with the lottery distributor. Random shuffling is accomplished mechanically or by computer means such as through implementation of a suitable software algorithm. A non-exclusive example of mechanical shuffling means includes the familiar lightweight balls having data printed on them that are projected about by air within a container then drawn from the container in a sequential fashion.

For example, in the NASCAR® race application, random shuffling, 22, of the prequalifying data $D_{PQ}$ is accomplished, either mechanically or by computer generation, as follows. The f final participants' racecar decal numbers, e.g., car number 89 driven by John Doe, car number 77 driven by Jane Roe, are placed into the random shuffling mechanism. The random shuffling mechanism assigns a number, from the set 1 through 43, to each decal number. Hence, John Doe's car may be assigned 43, while Jane Roe's car is assigned 9, which has no relationship to the starting lineup position of each car-driver combination. However, only those f final participants, chosen according to their pre-qualifying data $D_{PQ}$, are placed into the random shuffling mechanism. The random assignment of the numbers 1 through 43 to each of the f final participants is made available to the public by announcement from the lottery distributor over a communication link, or other communication means.

Upon conclusion of the pre-qualifying event, 18, assembly of pre-qualifying data $D_{PQ}$, and optional assembly of shuffled pre-qualifying data, $D_{PQ}$, the final event takes place, 24. The final event in the example followed herein is the NASCAR® race.

At the conclusion of the final event, concluding data, $D_C$, is assembled from the rankings of the final participants in the final event, 26. Winners are chosen from the final participants. Concluding data, $D_C$, of the n winners of the final event is stored and correlated back to the winners' pre-qualifying data, $D_{PQ}$, or shuffled pre-qualifying data, $D_{PQS}$, depending upon which embodiment of the invention is implemented, 28. The pre-qualifying data of the final event winners comprises the winning lottery data, $D_L$, the set of n winning lottery numbers. Winning lottery data, $D_L$, is stored on a storage medium associated with the lottery distributor. Successful players are those whose wagering data $D_W$ matches that of $D_L$, 30.

In the NASCAR® race application, the concluding data comprises the finishing position of each car-driver combination. Presuming all 43 cars completed the race, the concluding data, $D_C$, are the 1 through 43 finishing positions of the f final race participants. This data is then correlated to the pre-qualifying data, $D_{PQ}$, or shuffled pre-qualifying data, $D_{PQS}$, depending upon which embodiment of the invention is implemented.

For example, in the non-shuffled embodiment of the invention, if Jane Roe, car decal number 77, won the race then her concluding data is finishing position number 1. This concluding data is correlated back to her starting lineup position, which was second (2). Therefore, one of the set of n winning lottery numbers, $D_L$, is "2." The top n, in this example 5, finishers of the race are used to determine the n winning lottery numbers, $D_L$, by correlating the 5 winners back to their pre-qualifying data and using that pre-qualifying data as the winning lottery data. However, any predefined concluding data $D_C$ can be used to select the n winning lottery numbers; for example, the top n drivers having the highest maximum speed during the race can be deemed the "winners" and correlated back to their pre-qualifying data to determine the winning lottery numbers.

In the shuffled embodiment of the invention, the concluding data, $D_C$, is correlated back to the shuffled pre-qualifying data, $D_{PQS}$. Continuing with the NASCAR® example where Jane Roe, car decal number 77 won the race, or achieved the highest of some other predefined race concluding data, her concluding data is number 1. This concluding data is correlated back to her shuffled pre-qualifying data, which was nine (9). Therefore, one of the set of n winning lottery numbers, $D_L$, is "9". The top n, in this example 5, "winners" of the race are used in determining the n winning lottery numbers, $D_L$.

In either embodiment of the invention, successful players whose wagering data $D_W$ matches that of $D_L$ are awarded prizes, 32.

Certain optional features are implemented into the invention to add interest to the lottery method. One optional feature extends the lottery to allow unsuccessful players to enter a subsequent lottery for other prizes, preferably in the form of merchandise. Players who are unsuccessful in the original lottery phase enter into a second lottery phase, 34. In the second lottery phase, unsuccessful players enter their losing wagering data, $W_D$, through a communication link to a distributor, within a predetermined time period following the announcement of the winning lottery numbers, $D_L$ in the original lottery phase. In addition to entering their losing wagering data, the unsuccessful player also enters the account number provided to them by the distributor upon placement of the original wager into the lottery. No additional monetary payment or other consideration is required of the unsuccessful player in the second lottery phase. After the close of the time period allotted for entering the second lottery phase, the lottery distributor randomly selects winners from the originally unsuccessful players who entered this second phase, 36. Prizes are awarded to the second phase winners, preferably in the form of merchandise, 38.

Another optional feature of the present invention is the inclusion of "real-time" trading of wagering data, $D_W$, among certain players designated as "real-time" players. In addition to selecting $D_W$ at the beginning of the lottery, certain players select the option to be "real-time" players with the distributor 16. Real-time players are provided the option of trading $D_W$ amongst themselves, revising their $D_W$ with the distributor, and placing wagers based on odds posted by the distributor, collectively referred to as "trading," 25. This activity proceeds from the time the wagering data is selected up until a predetermined time preceding the conclusion of the final event. Prizes awarded to real-time players are separate from those awarded to the remaining players.

Although the invention has been described with application to a NASCAR® competition, the invention has application to a variety of phased competitions, including but not limited to tennis, or other "seeded" competitions where individuals or teams are invited or positioned to participate in one or more competitions comprising a final event, based upon their pre-qualifying data, or "seed;" "ranked" competitions such as golf, college football or basketball; and nonathletic competitions such as the Oscar® awards where the final participants are "nominated." A non-exclusive list of example phased competitions is presented in Table 1 below:

TABLE 1

| Phased Competition | Pre-qualifying Event | Pre-qualifying Data ($D_{PQ}$) | Final Event | Example Concluding Data ($D_C$) |
|---|---|---|---|---|
| tennis tournament | performance in current year of play or season | seed | tournament | final position in tournament |

TABLE 1-continued

| Phased Competition | Pre-qualifying Event | Pre-qualifying Data ($D_{PQ}$) | Final Event | Example Concluding Data ($D_C$) |
|---|---|---|---|---|
| golf tournament | performance in current year of play or season | rank | tournament | final position in tournament |
| Oscar ® awards | current year of movies | nomination | awards ceremony | best picture, best actor, best actress |
| auto race | time trials for race | starting position | race | final position-in race |

Also within the principles of the invention is the union of two or more phased competitions into a single lottery. A non-limiting example of such a union is a lottery whereby players select as wagering data, $D_W$, data from two phased competitions that take place relatively close in time. Winning lottery data, $D_L$, is then based on concluding data and correlation back to pre-qualifying data from each of the two competitions.

Embodiments of the present invention include a lottery based on fantasy sports outcomes. There are several sports, such as football, basketball, soccer, and baseball, that offer fantasy leagues for interactive, virtual competition in which people manage professional athletes versus one another based upon performance, that allows people to act as general managers of a pseudo team. There are over 30 million players in fantasy football alone and that number is growing every year. For the purpose of explanation of a lottery based on a fantasy sports, an example is described with respect to fantasy football. But the scope of embodiments of the present invention is not limited to only fantasy football.

Fantasy football is game where football fans compete against each other as team owners that draft players, trade players, pick up free agents, have a team roster, and select their weekly starters in formats that compare the actual performance of the football players and their teams against their peers. The goal of the fantasy football participant as team owner is to select which athletes or teams will have the most impressive performances during a given week. In order to be a successful fantasy football participant, one must make better choices of players and teams than his opponent makes.

To participate successfully, one must have the business savvy of a general manager, the knowledge of a pro scout, and the strategy of a head coach because in essence, these are the roles one must play in a fantasy league. There are many different type leagues one can choose to join. There are public leagues where one can test their skills against total strangers, or leagues where one can play against their friends. There are customized leagues, free leagues, leagues that offers one point pick'em, leagues that offer confidence points pick'em, salary cap leagues, and other type variations. Leagues can organized, managed, and over the Internet using a fantasy football hosting service.

Typically, one of the team owners serves as commissioner of the league. Rules for a scoring and starting lineup format are agreed to before the season starts. The rules can be managed by the commissioner of the league in typical online fantasy football leagues. The following example is similar to many common formats required for a starting lineup:

1 Quarterback, 2 Running Backs, 2 Wide Receivers, 1 Flex RB/WR, 1 Tight End, 1 Place Kicker, 1 Team Defense/Special Teams, and 6 Bench. There are many variations of this format.

The scoring format can have as many variations, if not more than the starting lineup format. Players earn their team points based on their performance in their weekly games; some examples are a touchdown counts as 6 points, a passing touchdown counts as 4 points, 6 points for each touchdown scored by the defense, 1 point for every 15 rushing yards, 1 point for every 10 receiving yards, 1 point for every 100 passing yards, etc. The list can become quite large and varied.

The forum for Fantasy Sports Lottery Wagering will provide a player who elects to wager with any number of potential sources of distributors such as a central bank or banker (a house), other players, or a state operated system. The wagering may be done over the Internet with any network connected device such as a cellular phone, a tablet computer, a person computer, or other hand held devices, etc. The player may wager by placing a direct bet on fixed odds for certain outcomes based on the performance by particular individual athletes or teams in a fantasy league provided by the distributor. The player may wager by purchasing a lottery ticket from the distributor, where the winning lottery tickets are based on the performance of athletes or teams in a fantasy league that have been randomly assigned numbers. The distributor would provide a trading/wagering platform for participants to trade lottery tickets between themselves, as well as trade for desired lottery tickets with the lottery distributor based on a price set by the distributor. This trading and wagering could be done substantially in real-time and "in-running" (i.e., wagering while the game is actually being played). Players will be able to trade and wager in-running as the game unfolds, with real-time odds and fantasy statistics on individual athletes and teams being updated throughout the duration of the game by live data feed.

An example of how an embodiment of the lottery works is as follows. The league that was used for wagering purposes has a format for the scoring, starting lineup, drafting, trading, and other issues that must be addressed for the league to function established by the provider. This way all the players would be on the same format for placing lottery wagers. There are many variations of how a lottery could be conducted based upon performance by individual athletes. For example, there may be 40 performance rated NFL quarterbacks for the lottery and the lottery may be based on which 6 of the 40 quarterbacks score the most points in a particular fantasy league that week. Players of the lottery would select any six numbers between 1 and 40. Before the games started for the week, each of the 40 performance rated quarterbacks would be randomly assigned a number between 1 and 40. In this example, a particular lottery player has chosen the numbers 5, 12, 18, 21, 33, and 40 as his lottery numbers. By random selection the number 5 was assigned Tom Brady, 12 was Tim Tebow, 18 was Peyton Manning, 21 was Drew Brees, 33 was Aaron Rodgers, and number 40 was assigned Tony Romo. After the games for the particular week conclude for this particular example, the quarterback who scored the most points in the fantasy league games that week is Tom Brady (number 5), the second best was Peyton Manning (number 18), third was Tim Tebow (number 12), fourth was Drew Breeze (number 21), fifth was Aaron Rogers (number 33) and sixth was Tony Romo (number 40). The winning lottery numbers in order were 5, 18, 12, 21, 33, and 40. The winning lottery player would be the lottery player who selected the winning numbers in that sequence. In this example, the lottery player was only one number out of sequence, but does not win the lottery in this embodiment. There are many, many variations of how the lottery could be conducted, but all are based on the randomization of numbers assigned to athletes or teams.

Some embodiments of the present invention include direct wagering on the outcome of a fantasy sporting event. That is, in the fantasy football example described above, lottery players can directly wager on which of the 40 performance rated quarterbacks will be in the top 6 after the games for that week. Alternative embodiments of direct wagering include choosing which team in the fantasy league will score the most points for the week, which team in the fantasy league will score the most points for the season, which team in the fantasy league will win the league championship, which team will win a game by the largest margin of victory, etc.

Some embodiments of the present invention include the trading of lottery numbers after the randomization process, as is described in further detail below. For example, in the fantasy football example above, after the random numbers have been assigned to the 40 performance related quarterbacks, lottery players can trade lottery tickets based on chance of the lottery numbers comprising winning lottery numbers according to the players' opinion of which quarterbacks will be successful that week and how the lottery numbers were randomly assigned to the quarterbacks after the lottery players picked their numbers.

Figure 3A:
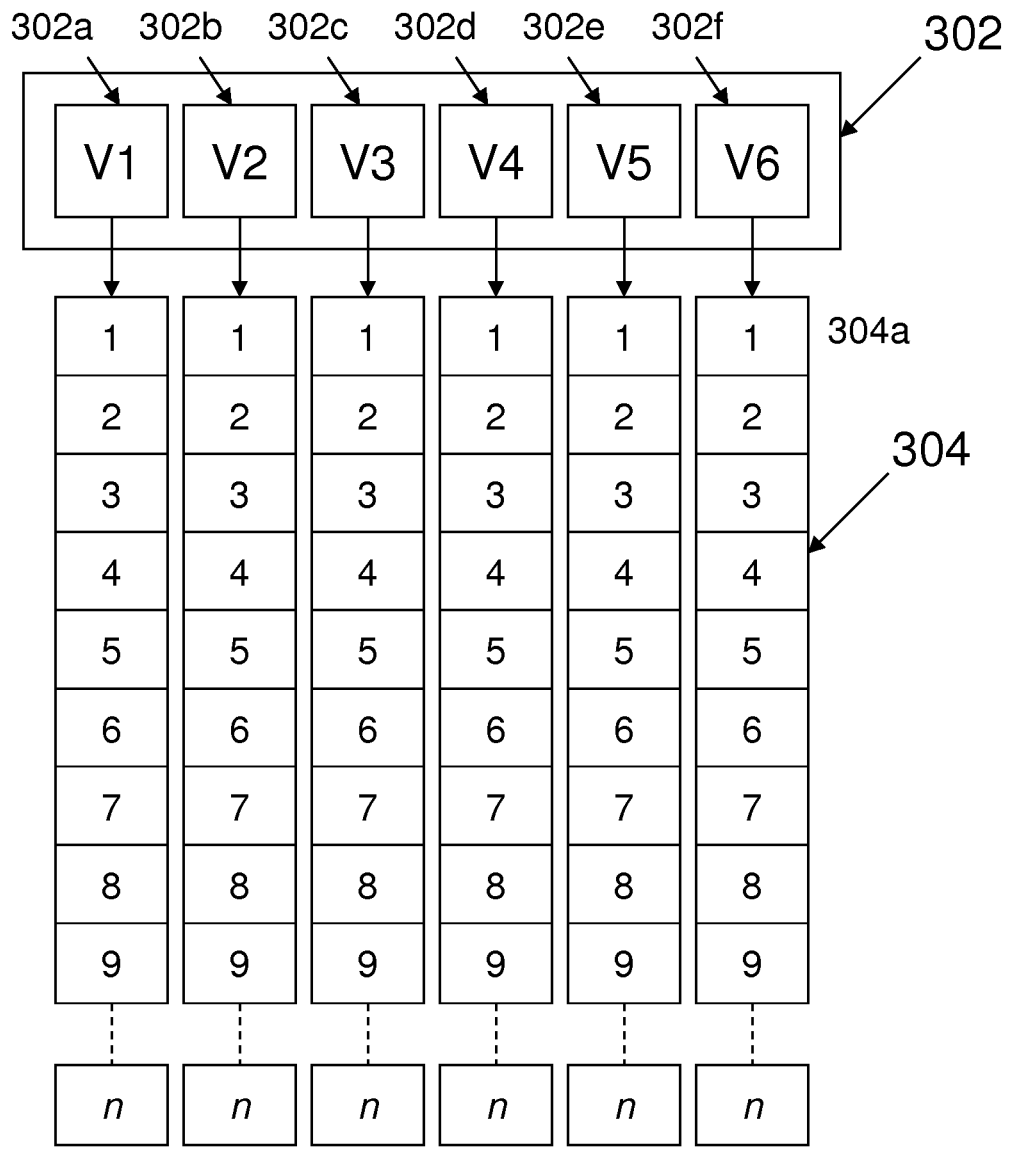
FIG. 3A is a diagram depicting a set of variables that can be used to provide a real-world lottery in accordance with an embodiment of the present invention.
Figure 3B:
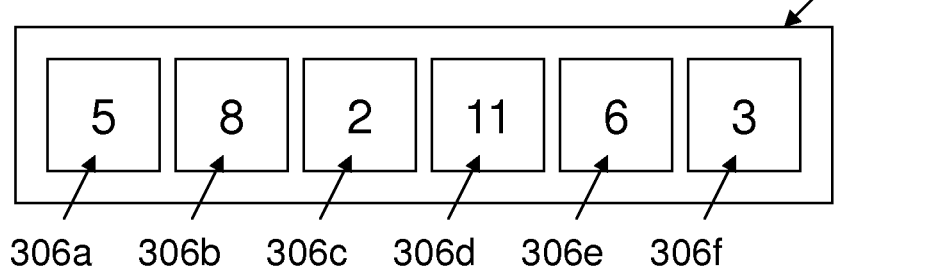
FIG. 3B is a diagram depicting a set of wagering numbers chosen by a real-world lottery player in accordance with an embodiment of the present invention.

Turning now to FIG. 3A, a diagram is shown depicting a set of variables that can be used to provide a real-world lottery in accordance with an embodiment of the present invention. Set of variables 302 can include any number of variables. In the example of FIG. 3, six variables 302*a-f* are shown in set 302. For each variable 302*a-f*, a lottery player selects a lottery number from a predetermined set of lottery numbers 304 (1 to n) for that variable. The lottery numbers 304 selected by the lottery player for the variables 302*a-f* comprises the lottery player's wagering numbers 306 as shown in FIG. 3B, wherein wagering number 306*a* corresponds to the selection of the lottery player for variable 302*a*, wagering number 306*b* corresponds to the selection of the lottery player for variable 302*b*, and so on. Wagering numbers 306 can be associated with the lottery player electronically by having the lottery player transmit wagering numbers 306 over a network to a lottery distributor before a specified deadline. Alternatively, wagering numbers 306 can be associated with the lottery player by means of possession of a lottery ticket that includes an indication of wagering numbers 306 sold to the lottery player by a lottery distributor before the specified deadline.

Each variable 302*a-f* represents a value that varies with time and is capable of having fixed value at a specified time. It is preferable for at least the values of variables 302 fixed at the specified time to be publicly available either in real-time or shortly thereafter so that lottery players can keep track of the value of variables 302 relative to wagering numbers 306. Using real-world events for which lottery players may have an interest, and randomizing values for those real-world events has the advantage of appealing to the interests of a wider range of potential lottery players than does the traditional lottery randomization process, such as televising a drawing of numbered balls from a hopper, which is not related to any other real-world event. For example, variables 302 could each represent a closing price of a market index, a stock price, a commodity price listed on a public exchange, or any combination thereof. Other variables 302 could represent an economic indicator that is periodically released by a governmental authority. Such a real-world lottery would appeal to potential lottery players who have an interest in business and financial matters, but would not be interested in following a lottery using the traditional randomization methods.

Figure 4A:
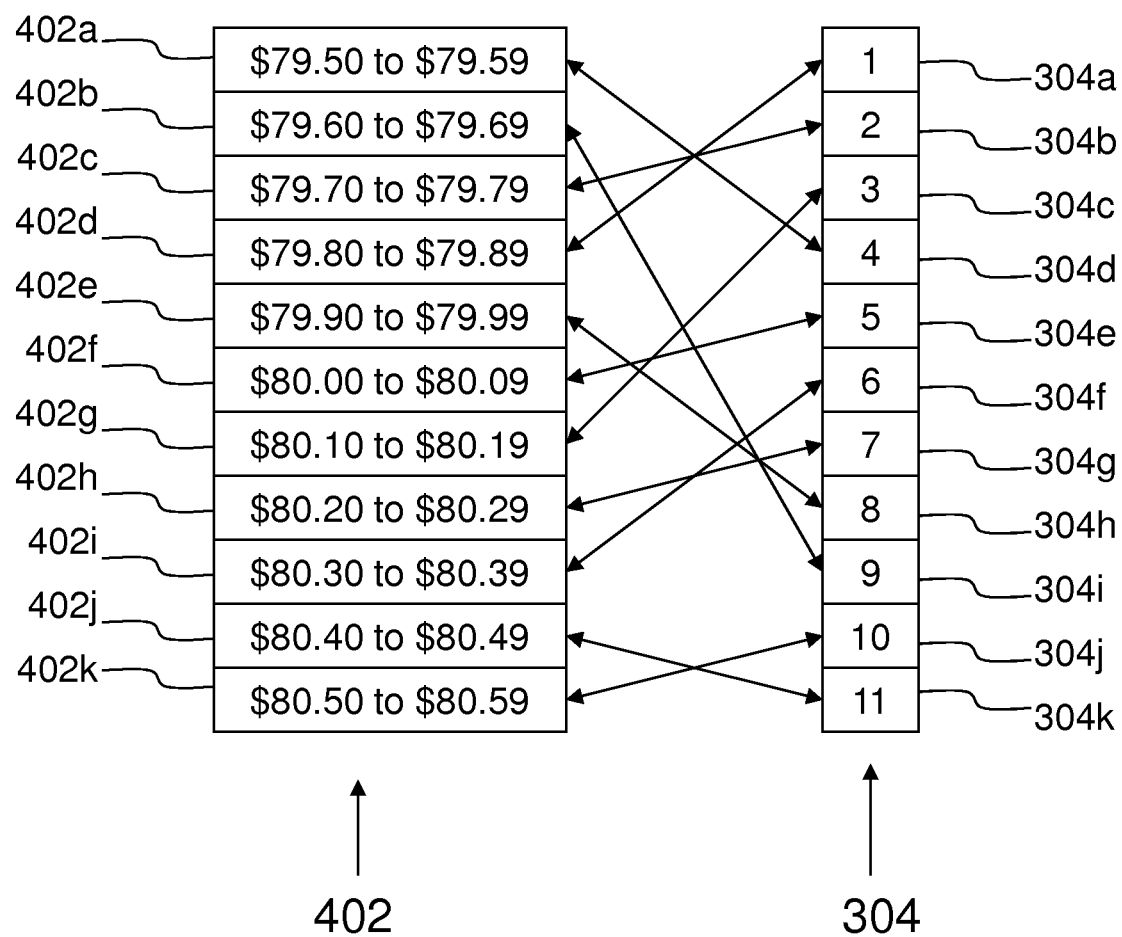
FIG. 4A is a diagram depicting the randomization of a range of values for a variable in accordance with one or more embodiments of the present invention.
Figure 4B:
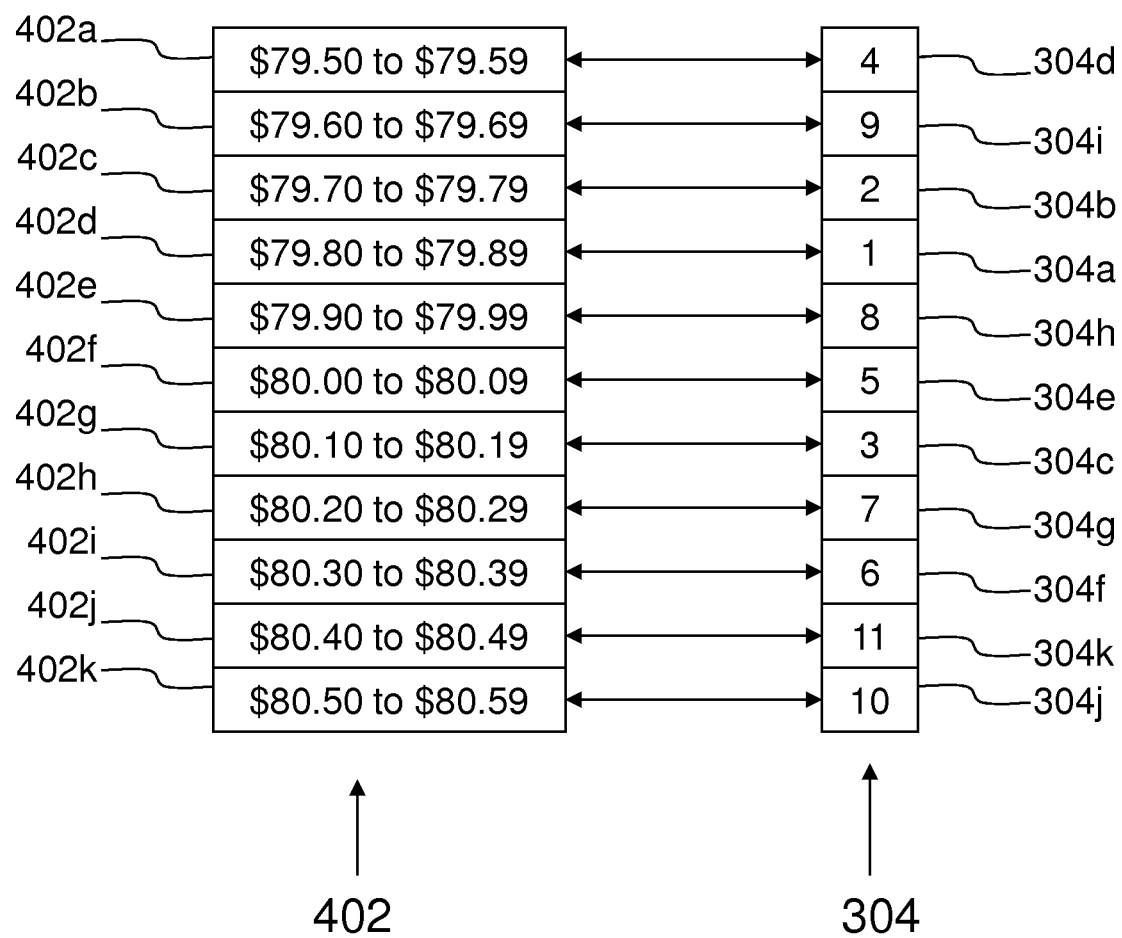
FIG. 4B is a diagram showing the relationships between increments 402a-k and lottery numbers 304a-k following the randomization process.

Turning now to FIG. 4A, a diagram is shown depicting the randomization of a range of values for a variable in accordance with one or more embodiments of the present invention. A range of values for each variable 302*a-f* is selected by the lottery distributor for a particular lottery event. The range of values is divided into a number of increments equal to the possible numbers from which the lottery player is allowed to choose for a given variable. For a particular exemplary lottery event, the value of variable 302*a* (V1) will be fixed as the closing price of a barrel of oil on May 1. A lottery player wishing to participate in the particular lottery event selects wagering number 306*a* for variable 302*a* from set of lottery numbers 304, where n=11 (i.e., numbers 1 to 11). At the time the lottery player makes the selection, the lottery player does not know how the selected wagering number 306*a* relates to the value of variable 302*a*. At some point in time prior to the specified date, May 1, the lottery distributor stops accepting wagering numbers 306 for this particular lottery event. The lottery distributor then determines a range of values for the closing price of a barrel of oil on May 1. In this example, the range of values is $79.50 to $80.59. Determining the range of values is up to discretion of the lottery distributor. The range of values may comprise computing a standard deviation in the variable over a period of time and choosing a range of values within a specified percentage of that standard deviation. The range of values for variable 302*a* is then divided into a set of n=11 increments 402 based on the number of lottery numbers 304 from which the lottery player selected wagering number 306*a*. Each of the lottery numbers 304 is then randomly assigned to an increment 402. For example, increment 402*a* (representing a closing price in the range of $79.50 to $79.59) is randomly assigned to lottery number 304*d* (number "4"). Increment 402*b* (representing a closing price in the range of $79.60 to $79.69) is randomly assigned to lottery number 304*i* (number "9"). Each increment 402 is randomly assigned one of lottery numbers 304 until each lottery number 304 is assigned to one of the increment 402. FIG. 4B shows the relationships between increments 402 and lottery numbers of 304 following the randomization process. The randomization process may be televised as is known in the art or broadcast live using other media, such as the internet, so that lottery players can follow, substantially in real-time, which increments will be represented by their wagering numbers on the specified date. As shown in the example of FIG. 3, the lottery player selected lottery number 304*e* corresponding to the number "5" as wagering number 306*a* for variable 302*a*. Lottery number 304*e* ("5") has been randomly assigned to increment 402*f* ("$80.00 to $80.09"). Therefore, after randomization, the lottery player can determine that if the price of oil closes between $80.00 and $80.09 on May 1, then wagering number 306*a* is a winning lottery number. The lottery distributor may decide in advance what constitutes a winning lottery number and how many winning lottery numbers in a set of wagering numbers are needed to win a prize in particular lottery event.

Turning now to FIG. 5, a flowchart 500 is shown depicting a process for randomizing real-world events for use in a lottery event in accordance with one or more embodiments of the present invention. At block 502, a lottery distributor selects a set of variables 302 for a particular lottery event. Alternatively, a lottery distributor may provide for individualized lottery events for registered lottery players wherein the lottery player can select a set of variables 302 for a particular contest directly from the lottery distributor, for example, using a web site of the lottery distributor. Proceeding from block 504, block 506 through block 512 is performed recursively for each of variables 302a-f. At block 506, the lottery distributor selects a range of values for the fixed value of variable 302a at a specified time. At block 508, the lottery distributor divides the range of values into n increments, where the lottery player selects a wagering number 306a for variable 302a from lottery numbers 304. At block 510, the lottery distributor randomly assigns a lottery number from the set of lottery numbers 304 to each increment in the set of increments 402. The random assignment is made so that each lottery number 304 is assigned to one of the increments in the set of increments 402. The specified time for evaluating the fixed value of variable 302a preferably occurs at a point in time after the lottery distributor performs the step of block 510 and before the lottery distributor performs the step of block 512. At block 512, lottery distributor selects a winning lottery number from lottery numbers 304 based on correlating the fixed value of variable 302a at the specified time with the increment 402 associated winning lottery numbers. For the example of wagering numbers 306 in FIG. 3, if variable 302a corresponds to the closing price of oil on May 1, and the price of oil closes in the range of $80.00 to $80.09 on May 1, then lottery number 304e (number "5") is selected as the winning lottery number for variable 302a because lottery number 304e was randomly assigned to the increment (increment 402f) in which the price of oil closed on May 1. After block 512, the process returns to block 504 until the steps of blocks 506 to 512 are performed for each variable in the set of variables. After the steps of blocks 506 to 512 are performed for each variable in the set of variables in the process ends.

The lottery distributor preferably receives wagering numbers 306 for all lottery players participating in a particular lottery event prior to the randomizing step of block 510. This way, the lottery players select sets of wagering numbers 306 without knowing which increment 402 is assigned to each of the wagering numbers 306a-f. Once randomization takes place at block 510, the assignment of lottery numbers 304 to increments 403 is then made available to the lottery players. With this information, a lottery player can determine which increments 402 are represented in the lottery player's set of wagering numbers 306 and monitor the real-world events relative to wagering numbers 306. Enabling the lottery player to monitor real-world events of interest to the lottery player relative to wagering numbers 306 in a lottery event can be more entertaining to a lottery player than simply watching a randomization process on television that is not linked to any other real-world event (or reading about the results of the randomization process in the newspaper the next day). At block 512, the fixed values of variables 302a-f are evaluated at the specified time and the lottery distributor selects a winning lottery number for each variable 302a-f. Subsequent to selecting the winning lottery numbers in block 512, the lottery distributor determines whether a lottery player is a winning lottery player based on correlating wagering numbers 306 associated with the lottery player and the winning lottery numbers. For example, assume a particular lottery event pays a $500 prize to any lottery player who has three winning lottery numbers in the lottery player's set of six wagering numbers 306. The particular lottery event may pay a $50,000 prize to any lottery player who has five winning lottery numbers in the lottery player's set of six wagering numbers 306. The particular lottery event may pay a very large accumulating jackpot prize (e.g., millions of dollars) to any lottery player who has six winning lottery numbers in the lottery player's set of six wagering numbers 306.

While the process of FIG. 5 has been described with respect to steps performed by a lottery distributor, the process of FIG. 5 may be automatically performed, whole or in part, by a lottery system administered by the lottery distributor or a central lottery hub with which the lottery distributor is affiliated. Such a system is described in further detail with respect to FIG. 6.

Figure 6:
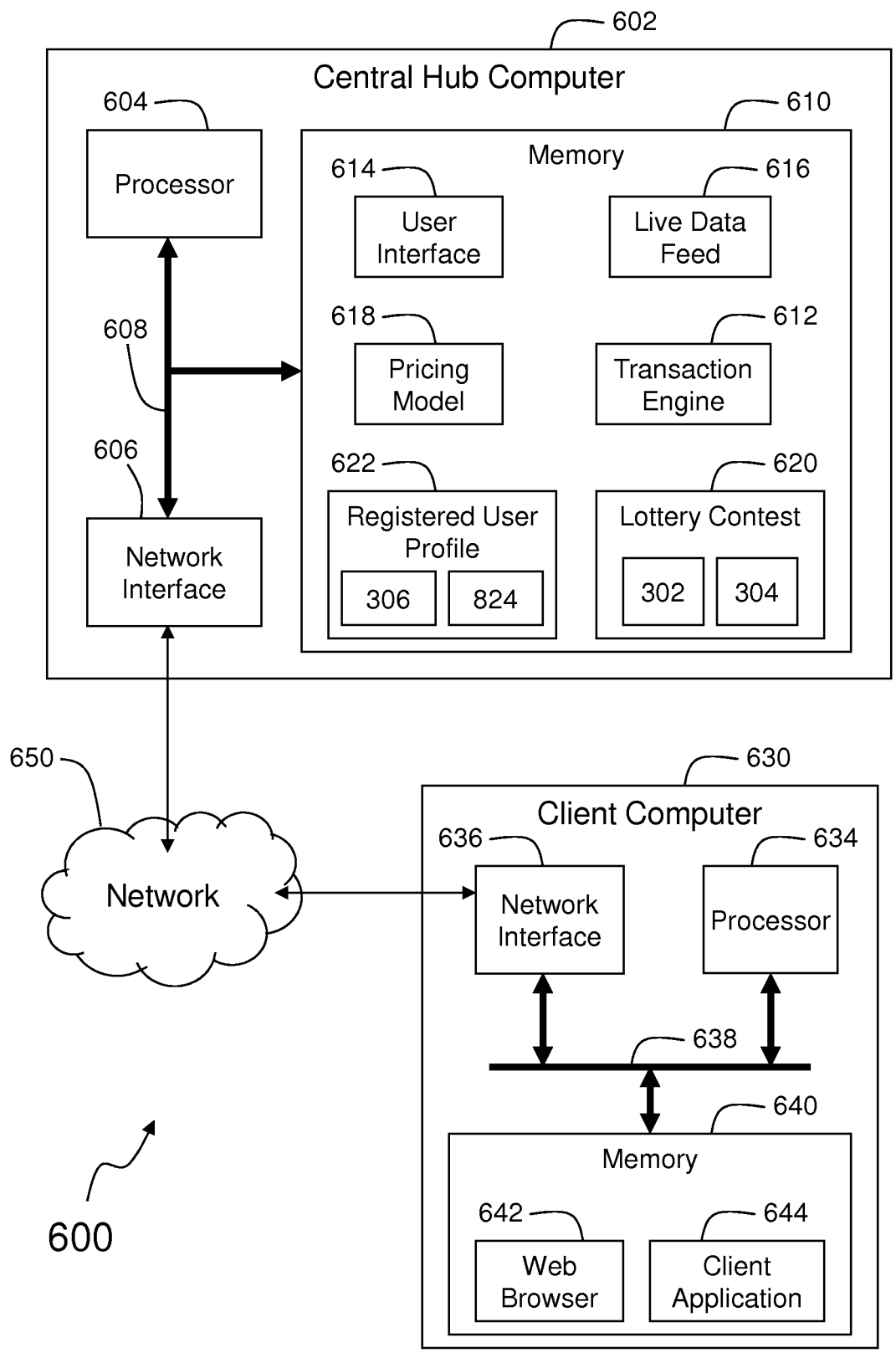
FIG. 6 is a diagram of a real-world lottery system suitable for implementing a real-world lottery in accordance with one or more embodiments of the present invention.

Turning now to FIG. 6, a diagram is shown of a real-world lottery system suitable for implementing a real-world lottery in accordance with one or more embodiments of the present invention. Real-world lottery system 600 may include central hub computer 602 and one or more client computers 630 communicatively coupled to central hub computer 602 by network 650. Network 650 can be a private network or a public network such as the Internet. Central hub computer 602 may include processor 604, network interface 606, and memory 610, each coupled to the other by bus 608. Processor 604 is capable of decoding and executing computer-executable instructions read from memory 610. Processor 604 is capable of reading data from and writing data to storage locations in memory 610. Memory 610 can be any computer-readable medium, or any combination thereof, suitable for storing computer-readable data, including volatile solid-state memory, such as random access memory (RAM) or cache memory, non-volatile solid-state memory, such as read only memory (ROM) or flash memory, or other persistent storage media, such as magnetic or optical disk drives. Network interface 606 is any device suitable for communicating data over network 650, such as an Ethernet network interface card or a wireless network adapter. Client computer 630 can be any data processing system known in the art that is capable of sending data to and receiving data from central hub computer 602 over network 650, such as a desktop computer, a laptop computer, a netbook computer, a tablet computer, a personal digital assistant (PDA), a mobile telephone, and so on.

Memory 610 is encoded with computer-executable instructions and data that, when executed by processor 604, provide transaction engine 612, user interface 614, live data feed 616, pricing model 618, one or more lottery events 620, and one or more lottery users 622. Live data feed 616 may provide lottery related data to client computer 630 substantially in real-time. Using live data feed 616, a lottery player can monitor the randomization of wagering numbers 306. Subsequent to the randomization of wagering numbers 306, a lottery player can use live data feed 616 to monitor the real-world values of the variables corresponding to wagering numbers 306 relative to the increments assigned to wagering numbers 306 of the lottery player. Monitoring live data feed 616 can provide a form of entertainment to a lottery player that is not available in lotteries with prior art methods of randomization. Live data feed 616 can also be used by a lottery player to evaluate potential trades, or to determine whether to buy or sell or place a direct wager on wagering numbers.

Pricing model 618 may be used to determine that payouts for a particular lottery event. For example, pricing model 618 may keep a running total of the accumulated jackpot for a particular lottery event. Pricing model 618 may also be used to determine odds and direct wagering data.

User interface 614 may comprise a graphical user interface through which a user interacts with the real world lottery system. User interface 614 may comprise world-wide-web ("web") content hosted by a web server that is capable of being communicated over network 650 and displayed to a user of client computer 630 using a web browser application 642. Alternatively, user interface 614 may be built-in to a dedicated client application 644 executing on client computer 630. Memory 610 may also store data and instructions related to one or more lottery events 620, including at least one set of variables 302 and the associated set of lottery numbers 304. User interface 614 may include promotional and educational materials to attract new lottery players. User interface 614 may include information relating to any or all of the lottery contests hosted by the lottery provider. By providing information of interest to lottery players or potential players, such as via a web site over the Internet, a lottery provider can increase the traffic to the lottery provider's web site. For example, the lottery provider can display information relating to the latest results of news events, elections, racing competitions, sports scores, closing prices of exchanged-traded securities, results of so-called "reality" television programs, Hollywood news, and/or celebrity gossip. User interface 614 can include a "ticker" that scrolls information across a portion of user interface 614.

Transaction engine 612 is operable to receive a request from a lottery player to participate in a lottery event. Transaction engine 612 may, via user interface 614, prompt a lottery player to set up a registered user profile 622. Registered user profile 622 may include a set of credentials 824 that can be used to authenticate a lottery player as a registered lottery user 622 and to associate wagering numbers 306 with the lottery player. Alternatively, the registered user profile 622 can be used to authenticate a lottery distributor that sells printed lottery tickets to the public. Transaction engine 612 may receive wagering numbers 306 from the lottery player, associate wagering numbers 306 with the lottery player, and process any necessary payment related to the transaction. Transaction engine 612 may also process any trades, buy/sell orders, or direct wagers made subsequent to the randomization of the lottery numbers.

In an embodiment of the real-world lottery system, the real-world lottery system provides a platform for lottery players to trade wagering numbers with each other, for selling wagering numbers to or buying wagering numbers from other lottery players or the lottery distributor, and placing direct wagers on wagering numbers based on odds posted by the lottery distributor. The trading/wagering platform may be embodied as part of transaction engine 612. Alternatively, the trading/wagering platform may comprise independent computer-executable code within memory 610. The trading/wagering platform enables the trading, buying and selling, and direct wagering after the randomizing step of block 510 has been performed. Lottery players may elect to have 100% matches or bid/ask trading when they post to sell or trade tickets. The trading/wagering platform may be completely transparent so that user interface 614 will reflect all changes in offerings, odds, bids, asks, money, consummated trades, etc. substantially in real-time. The trading/wagering platform may recognize postings associated with registered users for sale or trade of wagering numbers and may have the ability to provide the security for processing and allocating any transfer of funds or tickets to and from registered players' accounts substantially in real-time. The trading/wagering platform may require registration for lottery players designated as "real-time" lottery players to avoid system recourse for wagering errors committed by the player due to lack of competence or trading skill Registered real-time lottery players may access all of the functions the trading/wagering platform supports.

The trading and wagering of the trading/wagering platform can be done substantially in real-time and "in-running" (i.e., wagering while the real-world event is actually being conducted). Registered real-time players will be able to trade and wager in-running as the real-world lottery event unfolds, with real-time odds being updated throughout the duration of the event by live data feed 616 to pricing model 618 that will compute and post the new odds to user interface 614 as the situation dictates. In-running wagering can be an entertainment enhancer for the casual player and can provide specialty wagering during the event. These specialty wagers can consist of a wager based on which team scores first in a sporting event, how well an individual athlete performs relative to others in team sports, which individual is voted off a televised reality show first, or which character is murdered first on a television detective program series. Any fast-resolving wagering opportunity that provides entertainment for the lottery player as well as a mode of wagering can be a specialty wager. The trading/wagering platform can enable real-time lottery players to make suggestions for specialty wagers that they would like to see posted on user interface 614 to increase the wager turn-over from the casual player. Real-time players can wager against each other directly, with the trading/wagering platform serving as the processor and allocator of these wagers. Alternatively, real-time players can wager directly with the lottery distributor based on a fixed odds wagering mechanism provided by the trading/wagering platform.

The real-world lottery system is a real-time, straight-through processor of trades and wagers. At the point of a wager or deal capture, the system processes substantially in real-time the confirmations and allocations of trades and wagers with time stamped entries and exits. The system has the ability to pool wagers, and thousands of wagers and trades can be cleared per second. The system provides both posting and matching services to establish indication of trade or wager, as well as the direct fixed odds wagering. Matching may be implemented either through manual or automatic control. A pre-posting query checks for a 100% matching offer on the opposite side of the trade or wager. The posting mechanism provides a listing function so lottery players can view all outstanding trades or wagers. The lottery player may place any desired limitation on an offer, such as minimum trade size and timed expiration.

All trading and wagering can be totally transparent with a real-time, no-default clearing mechanism that provides two functions. The first function facilitates the real-time transfer of ownership of lottery tickets to the individual purchaser, and money for these lottery tickets to the lottery distributor. The first function also provides for the transfer of money and tickets between lottery players as they sell, purchase, or trade lottery tickets among themselves. The second function is to guarantee trade completion. After a trade is negotiated for a specific lottery ticket or lottery number at a set or negotiated price, the clearing process guarantees that the buyer has made a purchase and the seller has made a sale. The integrity of the trade and lottery is maintained for all transactions.

Risk management to the individual lottery player can comprise the lottery player's intentional selection and sizing of exposures to improve the quality and consistency of their returns. The real-world lottery system can measure various exposures for the lottery player, succinctly assimilate a more meaningful display via user interface 614 in the selection of such exposures, and provide a real-time, in-running forum for transacting the trade or wager. User interface 614 can display an odds line, win probability, and the return on a specific amount bet on variables 302 comprising the real-world lottery event. User interface 614 can display wagering data using an easily understood interpretation of odds wagering and can reduce the mystification of fixed odds wagering and the apprehension a casual lottery player faces when viewing more traditional fixed odds information. For example, an inexperienced lottery player may be intimidated by traditional fixed odds pricing of wagers and the win probability associated with the odds. An inexperienced lottery player may not be able to answer questions such as "what is the win probability of an odds line of 5-2, or 3-1?" The win probability for an odds line of 5-2 is 29%. The win probability for an odds line of 3-1 is 25%. User interface 614 can display the odds line (e.g., "5-2") along with the win probability (e.g., "29%") and the return on a specific bet amount. By displaying fixed odds, wagers and returns on a specific bet amount to a lottery player, the real-world lottery system can reduce or eliminate the apprehension of a new or inexperienced lottery player.

User interface 614 can display all germane financial data for a lottery player's account, and that data can be updated substantially in real-time as wagers and trades are made and the account is settled. The data displayed via user interface 614 can include all current open wagers or trades not settled, daily wagering and trading history, available funds, and current profit and loss status. The system will permit in-running and concurrent wagers and trades to be negotiated at multiple levels of functionality ranging from completely manual to completely automatic. A real-time lottery player can adjust the type and/or range of the functionality to meet specific requirements such as time constraints, trading skill, match qualifications, and real-time odds.

Figure 7A:
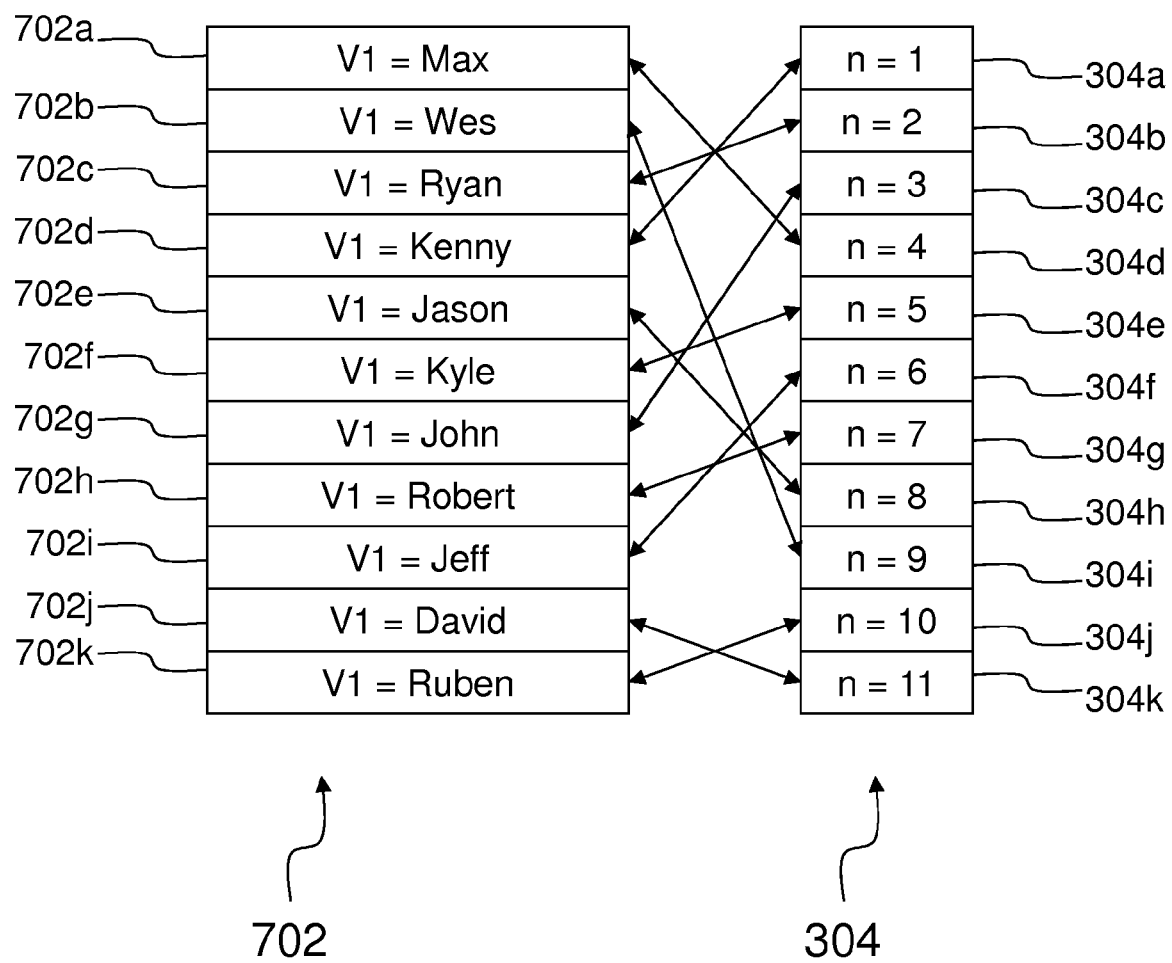
FIG. 7A and FIG. 7B are diagrams depicting the randomization of a set of participants participating in a competition in accordance with one or more embodiments of the present invention.

Turning now to FIG. 7, a diagram is shown depicting the randomization of a set of participants in a competition in accordance with one or more embodiments of the present invention. A set of participants 702 for each variable 302*a-f* is selected by the lottery distributor for a particular lottery event. The set of participants 702 comprises a number of participants in one or more specified competitions. The outcomes of the specified competitions are preferably available to the public throughout the duration of the competition or at least shortly after the conclusion of the competition. For example, the participants may be individuals competing on one or more television programs such as American Idol, Dancing with the Stars, Survivor, The Bachelor, etc. The participants may be individuals or sports teams competing in one or more sporting events, such as a Professional Golfers' Association (PGA) golf tournament, a Nation Football League (NFL) football game, or a National Basketball NBA basketball game. The participants may be candidates in one or more specified elections for one or more political offices. The participants may be candidates that are eligible to be nominated for an award, such as an Oscar Award, a Grammy Award, an Emmy Award, a Tony Award, a Nobel Prize and so on, and the competition may be which candidates receive a nomination for the award. The participants may be nominees for an award, such as an Oscar Award, a Grammy Award, an Emmy Award, a Tony Award, a Nobel Prize, and so on, and the competition may be which nominees win the award. The participants may be films presently showing in theaters and the competition may be gross box office receipts for a specific time period, such as the current week.

Figure 7B:
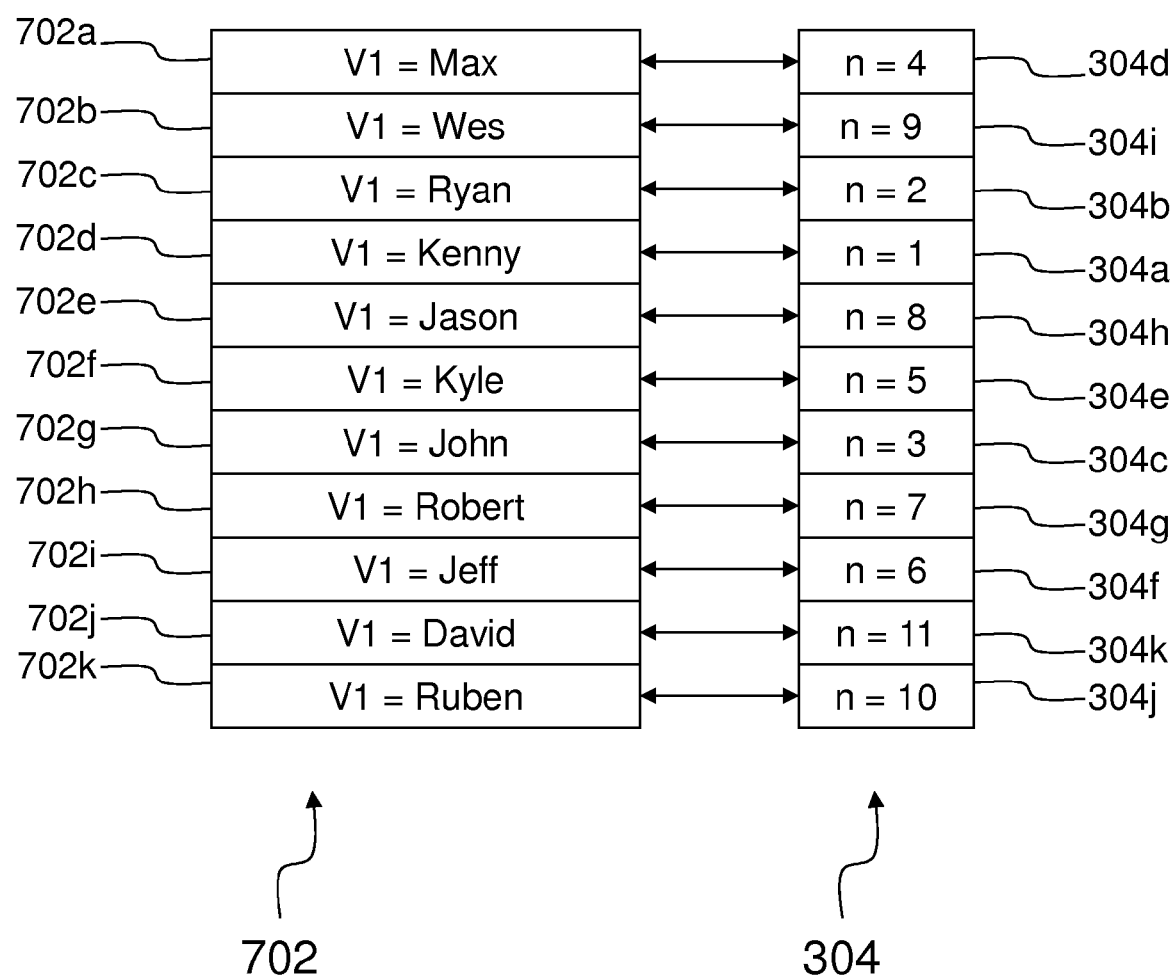

The number of participants 702 for each variable 302*a-f* is equal to the possible numbers from which the lottery player is allowed to choose for a given variable. For a particular exemplary lottery event, participants 702*a-k* correspond to eleven male participants competing against each other on the American Idol television program. A lottery player wishing to participate in the particular lottery event selects wagering number 306*a* for variable 302*a* from the set of lottery numbers 304, where n=11 (i.e., numbers 1 to 11). At the time the lottery player makes the selection, the selected wagering number 306*a* is not assigned to any of participants 702*a-k*. There is no relationship between participants 702*a-k* and lottery numbers 304*a-k*. At some point in time prior to a specified date for the lottery event (e.g., the date when the eleventh participant is voted off of American Idol), the lottery distributor stops accepting wagering numbers 306 for this particular lottery event. The lottery distributor then determines the participants remaining in the competition prior to an outcome of the competition being revealed to the public. In this example, the participants 702 comprise the eleven male participants 702*a-k* remaining on American Idol prior to the eleventh male participant being eliminated (e.g., Max, Wes, Ryan, Kenny, Jason, Kyle, John, Robert, Jeff, David, Ruben). Determining the competitions, the set of participants, the specified date, a combination of competitions and participants, a predetermined criterion for a winning lottery numbers, etc. is up to the discretion of the lottery distributor. Each of lottery numbers 304 is then randomly assigned to a participant 702. For example, participant 702*a* ("Max") is randomly assigned to lottery number 304*d* (number "4"). Participant 402*b* ("Wes") is randomly assigned to lottery number 304*i* (number "9"). Each participant 702 is randomly assigned one of lottery numbers 304 until each lottery number 304 is assigned to one of the participants 702. FIG. 7B shows the relationships between participants 702 and lottery numbers of 304 following the randomization process. The randomization process may be televised as is known in the art or broadcast live concurrently with or as part of the television program or using other media, such as the internet, so that lottery players can follow, substantially in real-time, which participants will be represented by the lottery player's wagering numbers 306 on the specified date. As shown in the example of FIG. 3, the lottery player selected lottery number 304*e* corresponding to the number "5" as wagering number 306*a* for variable 302*a*. Lottery number 304*e* ("5") has been randomly assigned to increment 702*f* ("Jeff"). Therefore, after randomization, the lottery player can determine that "Jeff" is represented by one of the players wagering numbers 306. If "Jeff" meets the predetermined criterion on the specified date, then wagering number 306*a* is a winning lottery number. The lottery distributor may decide in advance what predetermined criterion must be met for one of lottery numbers 304 to qualify as a winning lottery number. For the American Idol example, the predetermined criterion may be which participant in the set of participants 702 is eliminated in an episode of the television program. Alternatively, predetermined criteria may be set up for the entire season and include which participant is the first to be eliminated, which participant is the last to be eliminated, which participant will win the competition, or any combination of such predetermined criteria. The lottery distributor may also decide how many winning lottery numbers in a set of wagering numbers 306 are needed to win a prize in a particular lottery event.

FIG. 8 shows a flowchart 800 depicting a process for randomizing real-world events for use in a lottery event in accordance with one or more alternative embodiments of the present invention. The process begins at block 802. At block 804, a lottery distributor selects a set of variables, each variable representing a set of contestants. Then, for each variable in the set of variables (block 806), the lottery distributor randomly assigns lottery numbers to each contestant (block 808). The step at block 808 preferably includes the randomization step shown in FIGS. 7A and 7B. The step at block 808 is preferably performed after wagering data is received from lottery players but before the outcome of the real world event has been determined. The lottery distributor can publish the results of the randomization so that lottery players are able to know which outcomes of the real world event are represented by the lottery numbers they chose prior to the randomization step of block 808. Following the conclusion of the real world event, the lottery distributor selects winning lottery numbers based on a predetermined criteria (block 810). For the American Idol example, the predetermined criterion may be which participant in the set of participants 702 is eliminated in an episode of the television program. The lottery number randomly assigned to the participant that was eliminated from the particular episode of American Idol would be selected as a winning lottery number. The lottery distributor may also decide how many winning lottery numbers in a set of wagering numbers 306 are needed to win a prize in a particular lottery event.

FIG. 9 shows a web page depicting an exemplary user interface for a real world lottery in accordance with one or more embodiments of the present invention. The web page is an electronic page displayed to a user over a computer network, such as the Internet, using a well-known a web browser application 900. Web browser application 900 may comprise a window displayed in a graphical user interface of a computer. Web browser application 900 may include menu bar 902 for selecting computer commands using an input device such as a mouse. Web browser application 900 may include address bar 904 for inputting a uniform resource locator (URL) associated with the web page. Web browser application 900 may include content pane 906 for displaying content, such as a web page, accessible to web browser application 900 via the URL in address bar 904.

Content pane 906 may display a plurality of elements associated with a web page. Element 908 may be used by the lottery distributor to display information to lottery players or potential lottery players. Element 910 may include a plurality of information elements 910. Information elements 910 can comprise any information which the lottery distributor considers useful for driving web traffic to its website. For example, information element 910 can display information relating to a category of lottery contest provided by the lottery distributor. Categories may include, but are not limited to, sports, news, politics, entertainment, finance, etc. Information element 910 may also display headlines to articles or other multimedia content relating to information germane to that category. A user may select the headline with an input device to display the article associated with the headline. For example, information element 910 may display information relating to a sports category. Headlines may be associated with articles or other multimedia content relating to specific real world sporting events or participants. The lottery distributor may provide lottery contests relating to the real world events or participants featured in information element 910. Contest element 912 can be a button or hyperlink or other user interface element that, when selected by a user, would display to the user a web page that enables the user to participate in one or more lottery contests. Ticker 914 can also be used to display information to a user that the lottery distributor anticipates would be of interest to the user. Information may be displayed in a scrolling manner so that, over time, more information is displayed in ticker 914 than the area of the ticker 914 can display at a given instant. For example, ticker 914 can be used to display sports scores relating to recently concluded real world sporting events.

By displaying information that is of interest to current or potential lottery players in content pane 906, a lottery distributor can attract current lottery players and potential lottery players to its website. By attracting current lottery players and potential lottery players to its website, a lottery distributor can increase the chances that a potential lottery player will participate in a lottery contest and a current lottery player will participate in other lottery contests. Further, by attracting current lottery players and potential lottery players to its website, a lottery distributor can generate revenue based on web traffic using well-known advertising and other means. By displaying contest element 912 near information element 910, a lottery distributor can provide a quick and easy way for a user to participate in a lottery that relates to real world events associated with the category of information element 910.

Figure 10:
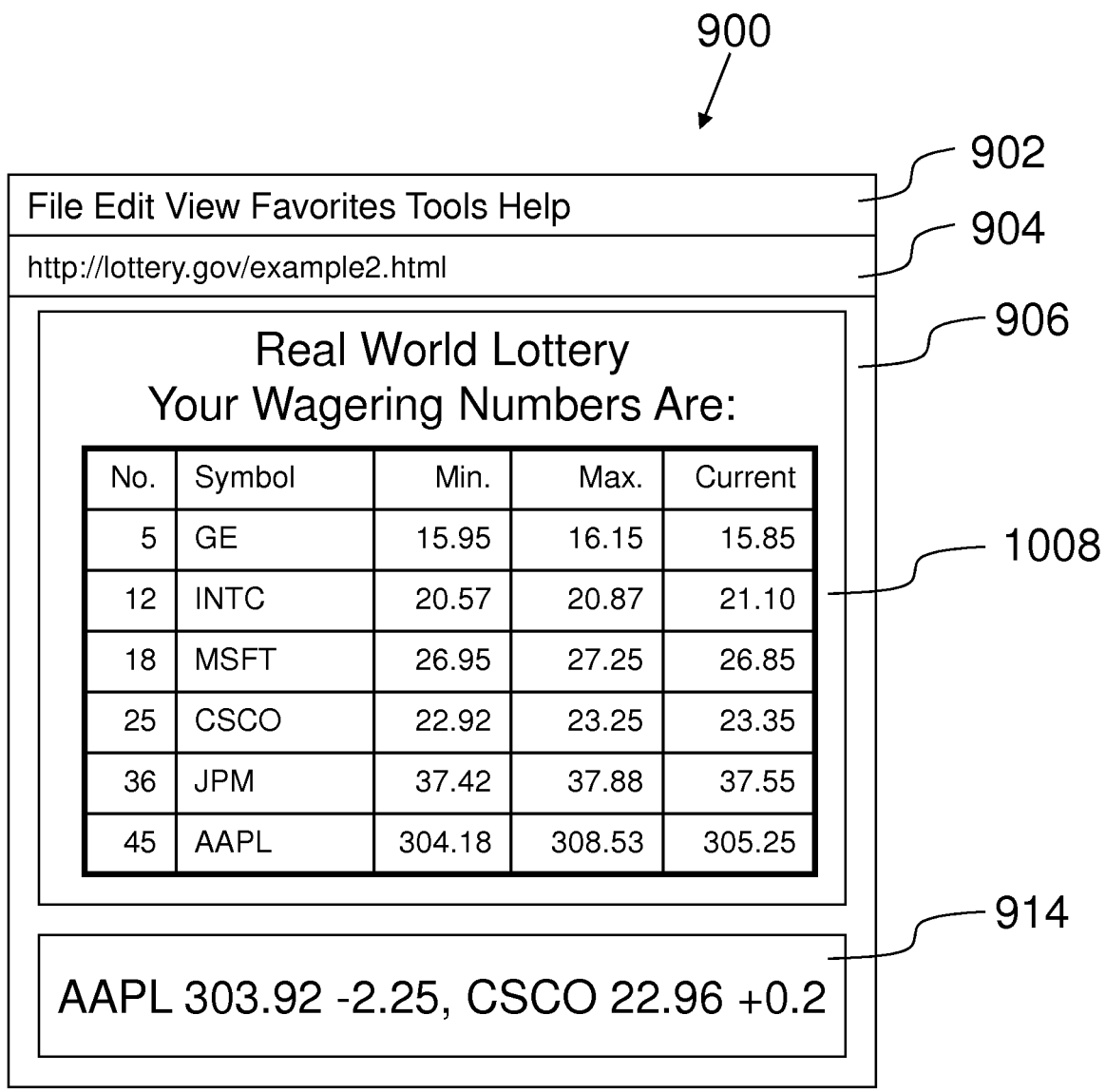
FIG. 10 shows a web page depicting an exemplary user interface for a real world lottery in accordance with one or more embodiments of the present invention.

FIG. 10 shows a web page depicting an exemplary user interface for a real world lottery in accordance with one or more embodiments of the present invention. Content pane 906 may display a plurality of elements associated with a web page, as described above in relation to FIG. 9. Element 1008 may be used by the lottery distributor to display information to of interest to current lottery players. Element 1008 may display the wagering numbers associated with a current lottery player and a particular lottery contest. Element 910 may show the current lottery player which variables have been randomly assigned with the wagering numbers selected by the user. For example, in a real world lottery contest based on the closing price of selected exchange-traded securities, element 1008 may display a table showing how each wagering number associated with the current lottery player was randomly assigned to a range of closing prices. Element 1008 may also display the current value of the price so that the current lottery player can follow, substantially in real-time, whether the price is within a range that would be a winning lottery number when the market closes. Ticker 914 can also display information relating to lottery contests in which the current user is participating.

While the particular method for lottery wagering on actual events as shown and disclosed in detail in this instrument is fully capable of obtaining the objects and providing the advantages stated, this disclosure is merely illustrative of the presently preferred embodiments of the invention, and no limitations are intended in connection with the details of construction, design or composition other than as provided and described in the appended claims.

Further, it should be recognized that embodiments of the present invention can be implemented via computer hardware, a combination of both hardware and software, or by computer instructions stored in a non-transitory computer-readable memory. The methods can be implemented in computer programs using standard programming techniques—including a non-transitory computer-readable storage medium configured with a computer program, where the storage medium so configured causes a computer to operate in a specific and predefined manner—according to the methods and figures described in this Specification. Each program may be implemented in a high level procedural or object oriented programming language to communicate with a computer system. However, the programs can be implemented in assembly or machine language, if desired. In any case, the language can be a compiled or interpreted language. Moreover, the program can run on dedicated integrated circuits programmed for that purpose.

What is claimed is:

1. A computer-implemented method for lottery wagering comprising causing a computer, communicatively coupled to a computer network, to perform the steps of:
   receiving, over the computer network, wagering data from each of a plurality of first lottery phase participants;
   entering the wagering data received from the first phase lottery participants into a first lottery phase;
   determining winning lottery data for the first lottery phase based upon the outcome of a first lottery event;
   determining one or more first lottery phase winners based on the first lottery phase participants whose wagering data matches the winning lottery data for the first lottery phase;
   awarding a prize to each of the one or more first lottery phase winners;
   entering the wagering data received from one or more of first lottery phase participants who are not also first lottery winners into a second lottery phase, in which the wagering data entered for each second lottery phase participant is the same wagering data received for the first lottery phase;
   determining winning lottery data for the second lottery phase based upon the outcome of a second lottery event, the second lottery event occurring at a time subsequent to the first lottery event;
   determining one or more second lottery phase winners based on the second lottery participants whose wagering data matches the winning lottery data for the second lottery phase;
   awarding a prize to each of the one or more second lottery phase winners.

2. The method of claim 1, in which the wagering data entered in the second lottery phase is automatically entered upon the completion of the first lottery phase.

3. The method of claim 2, in which the wagering data entered in the second lottery phase is automatically entered for each first lottery phase participant who is not a first lottery phase winner.

4. The method of claim 2, in which the wagering data entered in the second lottery phase is automatically entered for each first lottery phase participant who is a subscriber of a lottery service provided by a lottery distributor.

5. The method of claim 1, in which a request to be entered in the second lottery phase is received from each of the second lottery phase participants.

6. The method of claim 5, in which the request to be entered in the second lottery phase includes account information associated with the second lottery phase participant making the request.

7. The method of claim 1, in which the prize awarded to the second lottery phase winners comprises merchandise.

8. The method of claim 1, in which the winning lottery data for the second lottery phase is chosen randomly by a lottery distributor.

9. A computer system for lottery wagering comprising:
   a computer processor coupled to a computer bus;
   a non-transitory computer-readable medium coupled to the computer bus, the computer-readable medium encoded with computer-executable instructions that, when executed by the computer processor, cause the computer system to perform the steps of:
   receiving wagering data from each of a plurality of first lottery phase participants;
   entering the wagering data received from the first phase lottery participants into a first lottery phase;
   determining winning lottery data for the first lottery phase based upon the outcome of a first lottery event;
   determining one or more first lottery phase winners based on the first lottery phase participants whose wagering data matches the winning lottery data for the first lottery phase;
   awarding a prize to each of the one or more first lottery phase winners;
   entering the wagering data received from one or more of first lottery phase participants who are not also first lottery winners into a second lottery phase, in which the wagering data entered for each second lottery phase participant is the same wagering data received for the first lottery phase;
   determining winning lottery data for the second lottery phase based upon the outcome of a second lottery event, the second lottery event occurring at a time subsequent to the first lottery event;
   determining one or more second lottery phase winners based on the second lottery participants whose wagering data matches the winning lottery data for the second lottery phase;
   awarding a prize to each of the one or more second lottery phase winners.

10. The computer system of claim 9, in which the wagering data entered in the second lottery phase is automatically entered upon the completion of the first lottery phase.

11. The computer system of claim 10, in which the wagering data entered in the second lottery phase is automatically entered for each first lottery phase participant who is not a first lottery phase winner.

12. The computer system of claim 10, in which the wagering data entered in the second lottery phase is automatically entered for each first lottery phase participant who is a subscriber of a lottery service provided by a lottery distributor.

13. The computer system of claim 9, in which a request to be entered in the second lottery phase is received from each of the second lottery phase participants.

14. The computer system of claim 13, in which the request to be entered in the second lottery phase includes account information associated with the second lottery phase participant making the request.

15. The computer system of claim 9, in which the prize awarded to the second lottery phase winners comprises merchandise.

16. The computer system of claim 9, in which the winning lottery data for the second lottery phase is chosen randomly by a lottery distributor.

17. A non-transitory computer-readable medium for lottery wagering, the computer-readable medium encoded with computer-executable instructions that, when executed by a computer processor, cause a computer system to perform the steps of:
   receiving wagering data from each of a plurality of first lottery phase participants;
   entering the wagering data received from the first phase lottery participants into a first lottery phase;
   determining winning lottery data for the first lottery phase based upon the outcome of a first lottery event;
   determining one or more first lottery phase winners based on the first lottery phase participants whose wagering data matches the winning lottery data for the first lottery phase;
   awarding a prize to each of the one or more first lottery phase winners;
   entering the wagering data received from one or more of first lottery phase participants who are not also first lottery winners into a second lottery phase, in which the wagering data entered for each second lottery phase participant is the same wagering data received for the first lottery phase;

determining winning lottery data for the second lottery phase based upon the outcome of a second lottery event, the second lottery event occurring at a time subsequent to the first lottery event;

determining one or more second lottery phase winners based on the second lottery participants whose wagering data matches the winning lottery data for the second lottery phase;

awarding a prize to each of the one or more second lottery phase winners.

18. The non-transitory computer-readable medium of claim 17, in which the wagering data entered in the second lottery phase is automatically entered upon the completion of the first lottery phase.

19. The non-transitory computer-readable medium of claim 18, in which the wagering data entered in the second lottery phase is automatically entered for each first lottery phase participant who is not a first lottery phase winner.

20. The non-transitory computer-readable medium of claim 18, in which the wagering data entered in the second lottery phase is automatically entered for each first lottery phase participant who is a subscriber of a lottery service provided by a lottery distributor.

21. The non-transitory computer-readable medium of claim 17, in which a request to be entered in the second lottery phase is received from each of the second lottery phase participants.

22. The non-transitory computer-readable medium of claim 21, in which the request to be entered in the second lottery phase includes account information associated with the second lottery phase participant making the request.

23. The non-transitory computer-readable medium of claim 17, in which the prize awarded to the second lottery phase winners comprises merchandise.

24. The non-transitory computer-readable medium of claim 17, in which the winning lottery data for the second lottery phase is chosen randomly by a lottery distributor.

* * * * *